United States Patent [19]

Matsumoto et al.

[11] Patent Number: 4,847,696

[45] Date of Patent: Jul. 11, 1989

[54] SYSTEM WITH A TIMER SCREEN, FOR RESERVING THE RECORDING OF TV PROGRAMS

[75] Inventors: Katsumi Matsumoto; Hideo Kunii; Hideki Yamamoto; Toshiyasu Mori, all of Fukaya, Japan

[73] Assignee: Kabushiki Kaisha Toshiba, Kawasaki, Japan

[21] Appl. No.: 77,876

[22] Filed: Jul. 27, 1987

[30] Foreign Application Priority Data

| Jul. 28, 1986 | [JP] | Japan | 61-114608[U] |
| Jul. 29, 1986 | [JP] | Japan | 61-117109[U] |
| Aug. 11, 1986 | [JP] | Japan | 61-189244[U] |
| Aug. 22, 1986 | [JP] | Japan | 61-127084[U] |

[51] Int. Cl.⁴ .......................................... H04N 5/76
[52] U.S. Cl. .................................... 358/335; 360/33.1
[58] Field of Search .......................... 360/33.1, 14.1; 358/335, 191.1, 192.1, 181, 188; 364/144; 455/171, 181, 186, 231, 344; 340/707, 309.15

[56] References Cited

U.S. PATENT DOCUMENTS

| 4,193,120 | 3/1980 | Yello ............................... 358/335 |
| 4,222,069 | 9/1980 | Groetschel ....................... 358/335 |
| 4,475,153 | 10/1984 | Kihara et al. .................... 358/335 |
| 4,519,003 | 5/1985 | Scholz .............................. 358/335 |
| 4,641,205 | 2/1987 | Beyers, Jr. ....................... 358/335 |
| 4,695,831 | 9/1987 | Shinn ............................... 340/707 |

FOREIGN PATENT DOCUMENTS

| 0013634 | 7/1980 | European Pat. Off. . |
| 0019149 | 11/1980 | European Pat. Off. . |
| 3335082 | 3/1986 | Fed. Rep. of Germany . |
| 2541062 | 8/1984 | France ........................... 358/335 |
| 55-63185 | 5/1980 | Japan ............................. 455/186 |
| 55-99821 | 7/1980 | Japan ............................. 455/186 |
| 60-2687 | 1/1985 | Japan . |
| 1473634 | 4/1975 | United Kingdom . |
| 2044446 | 10/1980 | United Kingdom . |
| 2155713 | 9/1985 | United Kingdom . |

*Primary Examiner*—Donald McElheny, Jr.
*Attorney, Agent, or Firm*—Cushman, Darby & Cushman

[57] ABSTRACT

A timer reservation display controller outputs data to be displayed on a display screen. The data includes a predetermined number of guidances, menus, and items associated with timer reservation for the recording of several weeks of TV programs. The data is displayed in complete week intervals beginning with the current day. In conjunction with the displayed data, a pointing device allows the user to point to and select the displayed data to choose desired timer reservation periods for TV programs recording.

8 Claims, 22 Drawing Sheets

FIG. 7A
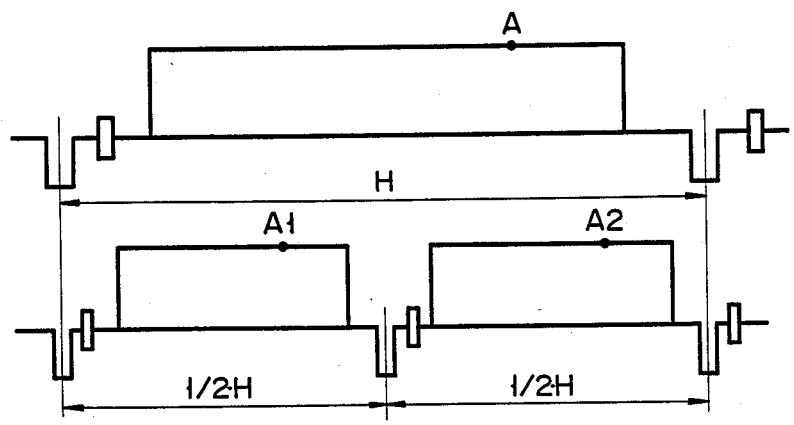
FIG. 7B
FIG. 8A
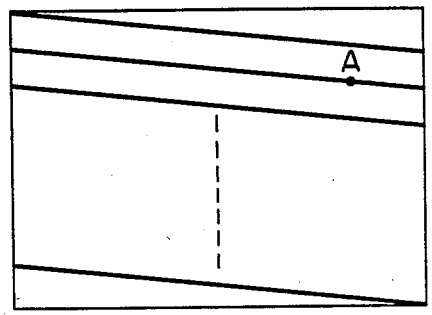
FIG. 8B
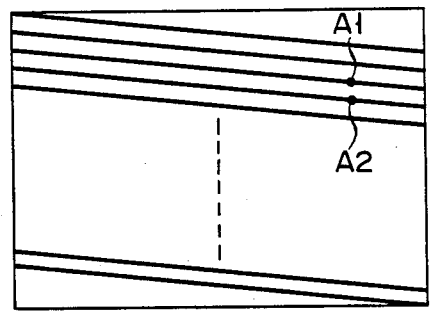

FIG. 11

F I G. 13A
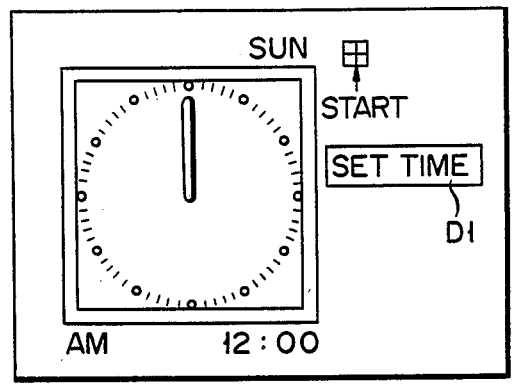
F I G. 13B
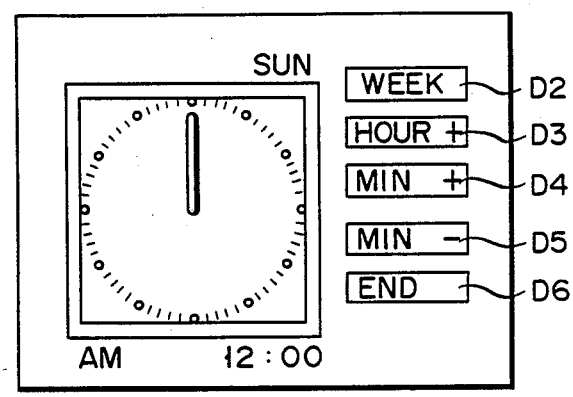
F I G. 13C
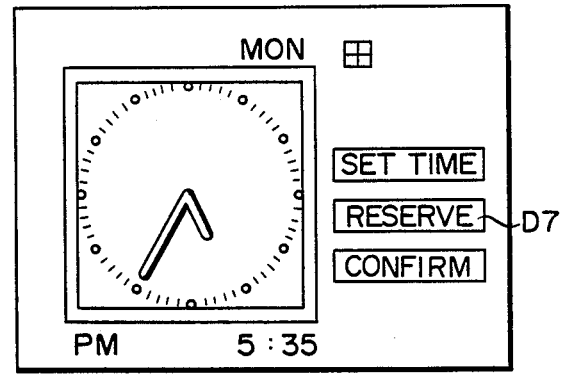

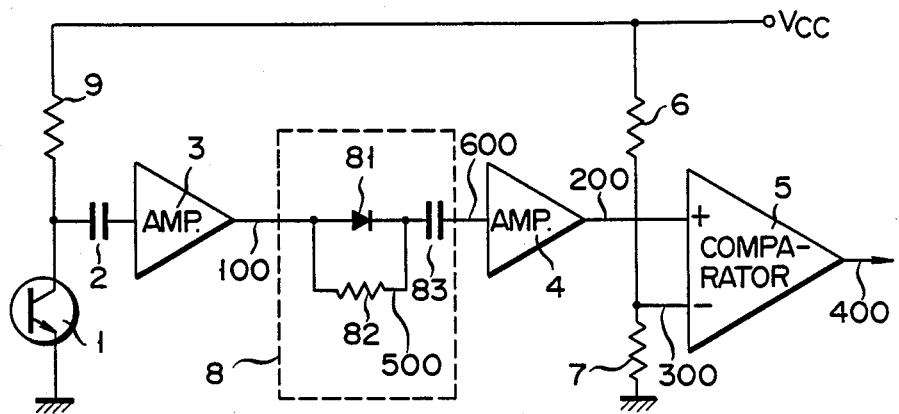
F I G. 15
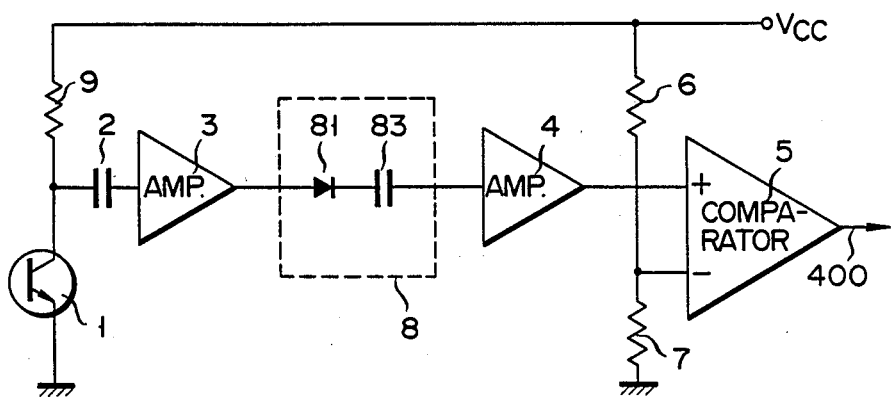
F I G. 17

F I G. 16A 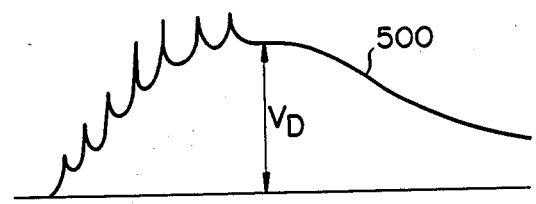
F I G. 16B 
F I G. 16C 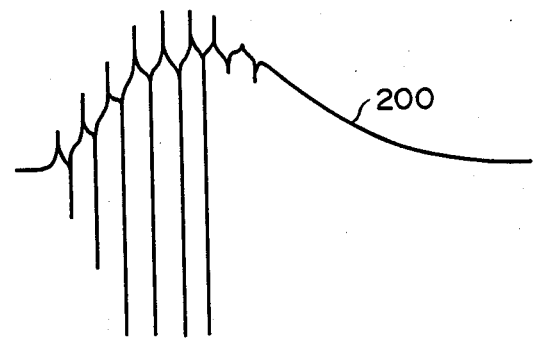
F I G. 16D 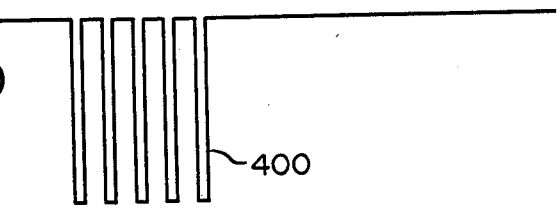

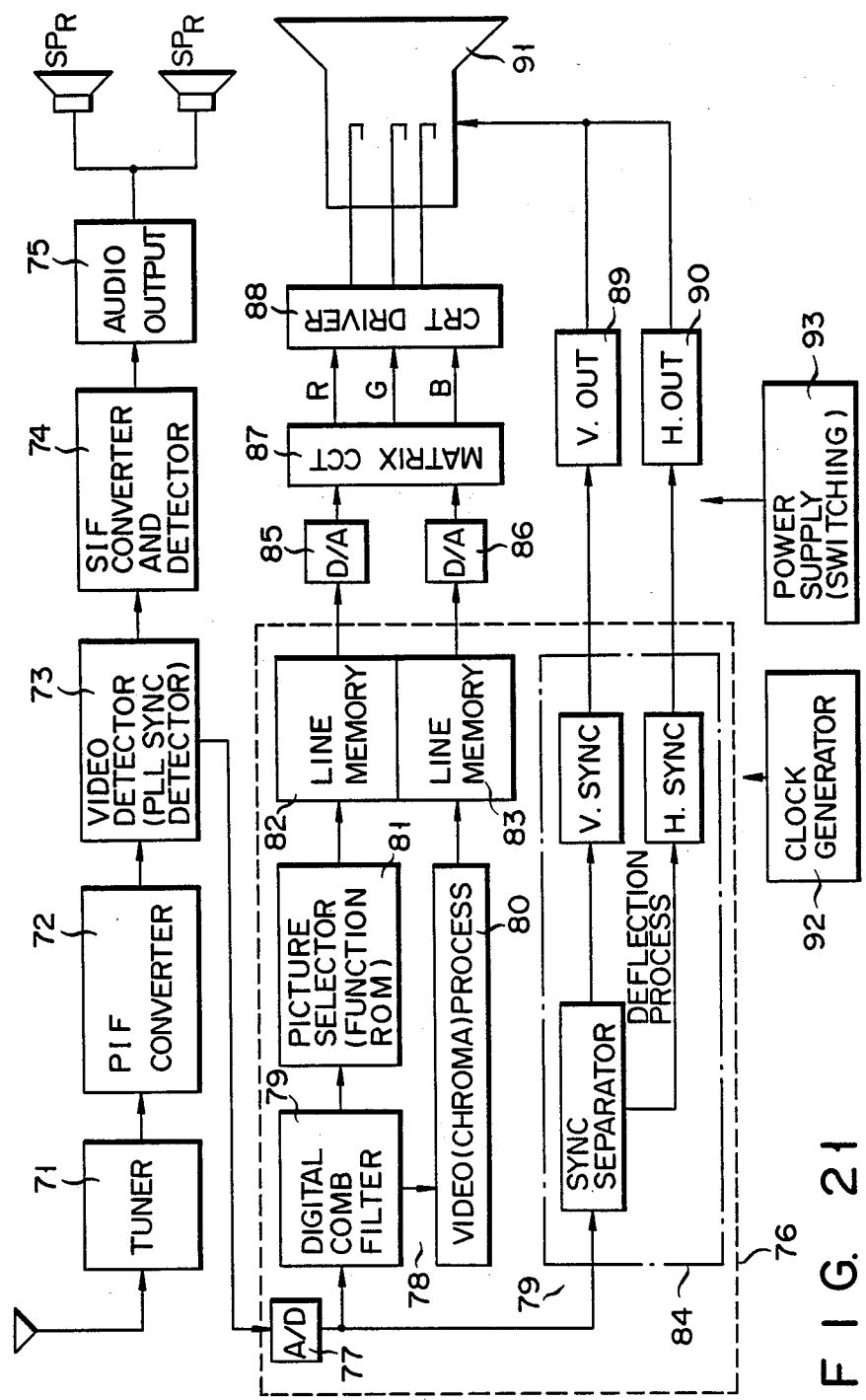
F I G. 21

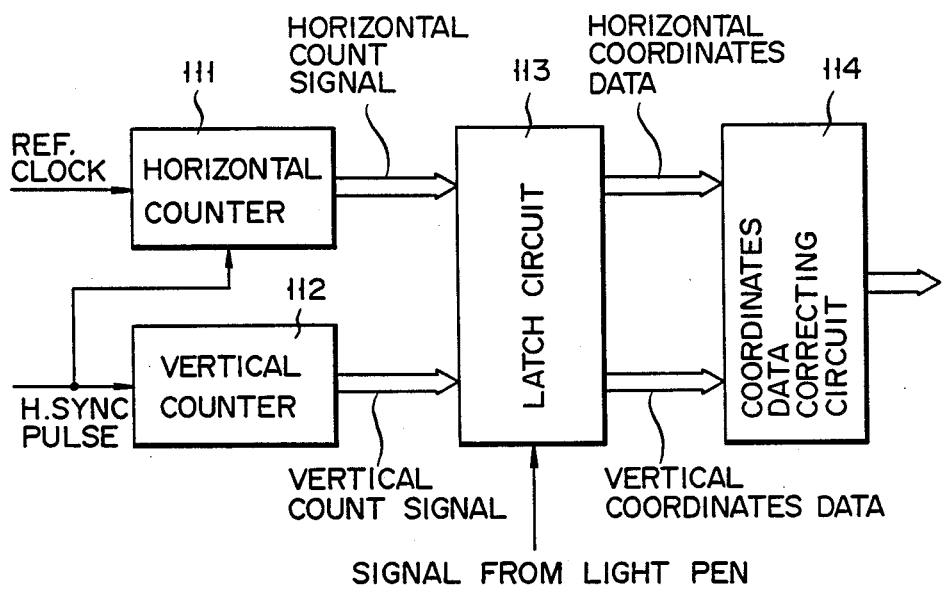
FIG. 23
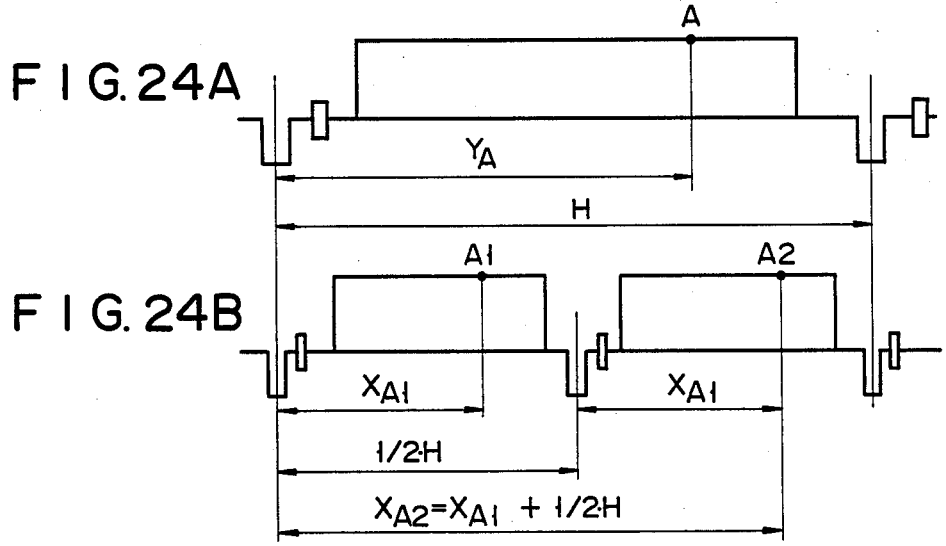
FIG. 24A
FIG. 24B

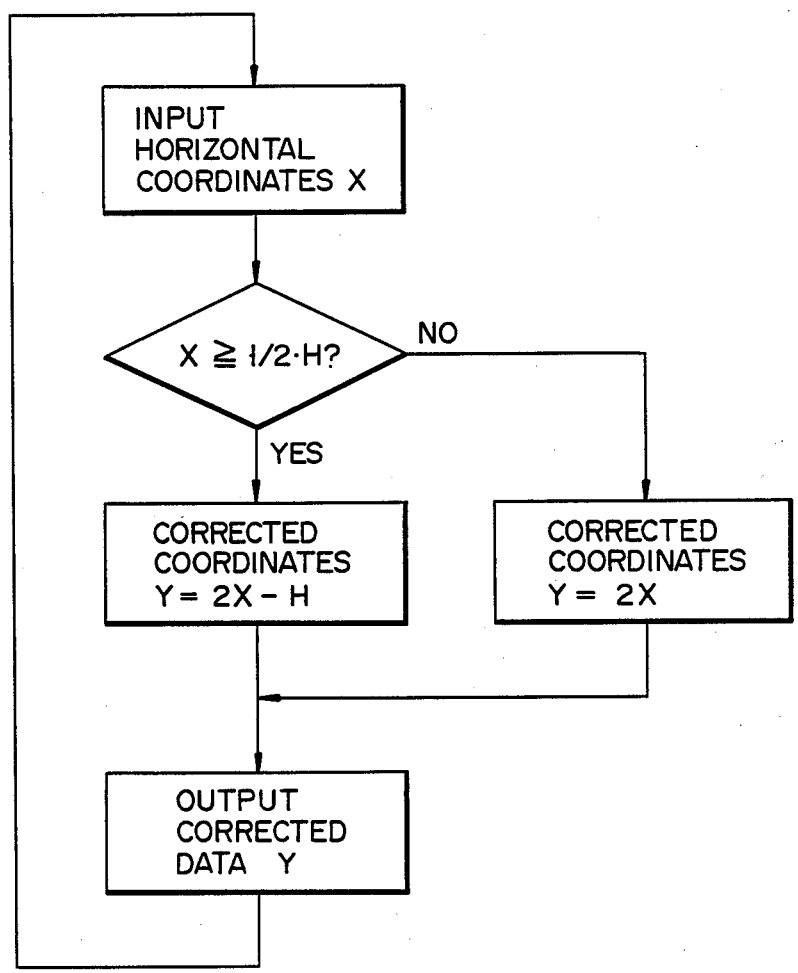
F I G. 25

SYSTEM WITH A TIMER SCREEN, FOR RESERVING THE RECORDING OF TV PROGRAMS

BACKGROUND OF THE INVENTION

This invention relates to a system for reserving the recording of TV programs, and more particularly, to a TV program recording reservation system having a display for displaying items of data required for reserving the recording desired TV programs, and the data about desired TV programs. The invention also relates to a display apparatus for displaying the data about desired TV programs, which can be used in combination with a video tape recorder (VTR) to display the data such that people can easily confirm the desired programs.

A conventional recording/reproduction apparatus such as a VTR has a timer reservation function, by means of which, the data, the recording start and end times, the channel number, and the like, of a program to be reserved are designated, so that the apparatus can be set in an automatic recording state.

With the conventional program reservation systems, the recording of TV programs is reserved by operating keys in accordance with an instruction manual. Data identifying the programs is displayed on a display, such as a phosphor display tube, to confirm whether or not the data correspond to the desired programs. If the display shows the wrong data, the keying operation must be performed again to correct the data. This keying operation is combersome and time-consuming.

Some of the conventional systems of this type can display the data identifying a desired program on the screen of a TV set. The data includes items such as the recording start time, the day of the week, the recording end time, the channel number, and the recording speed. It also includes data showing whether or not the day of the week is within the same week as the day the program is reserved. These data items are displayed in one line or a plurality of lines. When the recording of two or more TV programs is reserved, the items of data about these programs are displayed in the order they have been selected.

With the conventional program reservation systems, only the data regarding the desired programs is displayed on the TV screen, but not the date when the recording of these programs is reserved. Generally, the user wishes to know how many days will pass until the specific program is broadcast, from the day when he or she reserves the program. Since the date of reserving the recording is not displayed on the TV screen, it is difficult for him or her to quickly understand how many days will pass until the specific program is broadcast. The user cannot help but consult the calendar to confirm how many days will pass until the program is broadcast.

A light pen can be used to reserve TV programs. More specifically, the user touches a light pen on the screen of a CRT display, which is a useful man-machine interface, thereby to input data showing the coordinates of the point on the screen the pen is touching. Alternatively, a tablet and a stulus pen can be used to reserve the recording of desired TV programs. In this case, when the stulus pen touches any point on the tablet, the data representing the coordinates of this point can be input. Hence, by using a light pen, or a stylus pen and a tablet, the data identifying a desired TV program can be input, thus reserving the time period for recording the program.

The use of a light pen in reserving the recording of TV programs, however, results in some problems.

The first problem comes from the signal amplifier circuit for receiving a raster beam from the CRT screen and generating a pulse signal for detecting the point on the screen where the light pen is touching.

FIG. 1 shows a conventional signal amplifier circuit used in this type of light pen. Phototransistor 1, as a photodetector attached to a light pen body (not shown), receives a raster beam emitted from the CRT screen. A raster beam signal, obtained by photoelectrically converting the raster beam, is output to amplifier 3 via capacitor 2. Amplifier 3 inverts and amplifies the input raster beam signal, to obtain signal 100 shown in FIG. 2A. Signal 100 is inverted and amplified by amplifier 4 to obtain signal 200, as is shown in FIG. 2B. Signal 200 is input to the positive input terminal (+) of comparator 5. The negative input terminal (−) of comparator 5 receives threshold voltage 300 obtained by voltage-dividing power supply voltage Vcc by resistors 6 and 7. Comparator 5 waveshapes signal 200 with threshold voltage 300, and outputs pulse signal 400 shown in FIG. 2C. A position detector (not shown) has a counter for performing a count operation in synchronism with the raster scan. The count value of the counter is latched in response to the first or last pulse of pulse signal 400, thereby detecting a screen position designated by the light pen.

In the above circut, phototransistor 1 receives a weak raster beam. Alternatively, if phototransistor 1 receives a strong raster beam while the gain of amplifiers 3 and 4 is increased, the light-receiving angle of phototransistor 1 is widened in the vertical direction. In this case, as is shown in FIG. 3, if light pen selection portions a, b, and c are provided adjacent to each other in the vertical direction on the CRT screen, signal 200 and pulse signal 400, shown in FIGS. 4A and 4B, are produced by the circuit shown in FIG. 1. This occurs in spite of light pen selection portion a having been designated by the light pen. More specifically, as is shown in FIG. 4A, signal 200 is formed by the raster beams from light pen selection portions b, a, and c, and accordingly, pulse signal 400 is also formed by light pen selection portions b, a, and c, as is shown in FIG. 4B. Therefore, even though the light pen has designated selection portion a, the position detector erroneously selects selection portion b in response to the first pulse of pulse signal 400, which has been counted and latched, and selects selection portion c in response to the last pulse of pulse signal 400, which has been counted and latched. Therefore, in the conventional light pen signal amplifier circuit, circuit gain is limited, as is also, the amount of light received. Therefore, the conventional circuit can only be used in a specific CRT. When the light-receiving angle is widened in the vertical direction of the light pen, it is also widened in the horizontal direction. However, this horizontal widening of the light-receiving angle be can be cancelled out by the differential effect of the capacitor.

As has been described above, in the conventional light pen signal amplifier circuit, a situation can occur where a weak raster beam is first received and a strong raster beam is subsequently received while the circuit gain is increased. In response, the light-receiving angle of the phototransistor is widened in the vertical direction, and the position where the light pen touches the screen cannot be precisely detected.

The second problem with the use of a light pen in reserving the recording of TV programs, derives from the wave-shaping circuit for shaping the waveform of the signal output from the light pen.

FIG. 5 shows a waveshaping circuit of this type. A signal from photodetector 11 incorporated in a light pen body (not shown) is amplified by amplifier 12, and is supplied to the positive input terminal "+" of comparator 13. The negative input terminal "−" of comparator 13, on the other hand, is supplied with a voltage obtained by voltage-dividing power supply voltage Vcc, as a threshold-level voltage, by voltage-dividing resistors R1 and R2. Comparator 13 waveshapes the output signal from photodetector 11, based on the threshold level. However, the threshold-level voltage applied to the negative input terminal of comparator 13 is obtained by voltage-dividing power supply voltage Vcc. Therefore, the threshold level is influenced by any fluctuation in power supply voltage Vcc. As a countermeasure against any variations in the power supply voltage for each circuit, resistors R1 and R2 must variable resistors, and their resistances must be adjusted to each circuit.

As has been described above, in the conventional waveshaping circuit, the voltage for setting the threshold level of the comparator is influenced by fluctuations and variations in the power supply voltage, and thus, a stable waveshaping operation cannot always be performed.

The third problem with the use of a light pen in reserving TV programs lies with a light pen apparatus used for a TV receiver for displaying a video signal when the horizontal deflection frequency of the signal is converted to twice that of the original video signal.

When a recent-model CRT display such as a TV receiver is connected to a VTR, a video disk player, and the like, a higher image quality is required than would be in the case of displaying a broadcast image. For example, the vertical deflection frequency is left at 60 Hz, and the horizontal deflection frequency is converted to twice that of the conventional interlace scheme, so as to allow display.

This scheme is known as a double scan (noninterlace) scheme. In the conventional 2:1 interlace scheme, since only 262.5 scanning lines are available for each field, an image appears coarse and flickering. In the double scan scheme, since the horizontal deflection frequency is twice that of the conventional interlace scheme, each field has 525 scanning lines. Therefore, flickering is reduced, and a high-quality image is provided.

FIG. 6 is a block diagram showing a conventional circuit using a light pen. In FIG. 6, reference numeral 21 denotes a horizontal counter; and 22, a vertical counter. Horizontal counter 21 counts reference clocks whose frequency is determined in correspondence with pixel size, and generates a horizontal count signal. Vertical counter 22 counts horizontal sync pulses and generates a vertical count signal. The count signals are respectively input to latch circuit 23, and are latched by a signal from light pen 25, which detects a raster beam from screen 26. Therefore, the values of the count signals latched by latch circuit 23 respectively represent horizontal and vertical coordinate data showing the position of light pen 25. A timing signal for various control operations can be generated based on the coordinate data, showing the point where the light pen is touching the screen or the point where the light pen coincides with another predetermined point, so the user can select the operation mode of the recorder.

FIGS. 7A and 7B respectively show a video signal having a horizontal deflection frequency of 15.73426 kHz (NTSC color television scheme) and a video signal whose horizontal deflection frequency is twice that of the above signal, for the sake of comparison. Pointing the light pen to point A, designated in one horizontal period H, in the case of the original horizontal deflection frequency (see FIG. 7A), undesirably corresponds to two points, A1 and A2, in the first and second halves, i.e., ½·H periods when the frequency is doubled, as is shown in FIG. 7B. When the signal shown in FIG. 7B is displayed on a screen, by means of the double scan scheme, point A, shown in FIG. 8A, is converted to points A1 and A2, shown in FIG. 8B.

Therefore, when a point is designated, by the light pen, at the same position as point A for the video signal displayed, as shown in FIG. 8B, the recorder cannot discern whether the control operation has been started in response to pointing the light pen at location A1 or A2.

As has been described above, in the conventional external data input scheme using the light pen, when a video signal, which is converted to have a horizontal deflection frequency twice that of an original video signal, is displayed on a TV receiver performing double scan, i.e., non-interlace scanning, and the light pen is operated, the coordinates of the original video signal on the screen are different from those of the converted video signal on the screen. Therefore, the pointed location of the light pen on the original image cannot be accurately deciphered by the recorder, and an operation error may occur.

SUMMARY OF THE INVENTION

It is, therefore, an object of the present invention to provide a new and improved weekly reservation system for TV programs recording with a timer screen, with which a predetermined content on a screen on which a guidance or menu and items associated with weekly timer reservation periods are displayed. Further, the user may select weekly recording schedules, so that a desired recording content can be easily reserved.

It is another object of the present invention to provide a timer reservation display apparatus which can display a selected reservation schedule as an absolute position with reference to a present day of the week at a confirmation time and can display the reservation schedule so as to allow easy visual confirmation.

It is still another object of the present invention to provide a TV program reservation system with a timer screen utilizing a light pen as an input means, which comprises a light pen signal amplifier circuit which can output a pulse signal upon reception of a raster beam at the directional center of the light pen to a specific position to prevent an erroneous operation even when a circuit gain is increased.

It is still another object of the present invention to provide a TV program reservation system with a timer screen utilizing a light pen as an input means, which comprises a light pen waveshaping circuit which can always perform a stable waveshaping operation, free from the influence of fluctuations and variations in power supply voltage.

It is still another object of the present invention to provide a TV program reservation system with a timer screen utilizing a light pen as an input means, which comprises a coordinate data correction apparatus for a light pen, which corrects coordinate data for indicating a pointed location so that the same timing detection as for that for a pointed location of an original video signal can be performed after a scan scheme is converted from a conventional interlace scheme to a double scan scheme, whereby position coordinates of the light pen cannot be shifted even if a display operation is performed while the scan method of a TV receiver is converted.

A first aspect of the present invention provides a system for reserving the recording of TV programs from a TV having a CRT display. The system outputs data for display on the display screen including a predetermined number of guidances, menus, and items associated with several weeks of the TV programs to be recorded. Thus, the recording of desired TV programs is timer-reserved for a several week period. The system also includes a pointing device for selecting from the data displayed on the display screen to generate a reservation schedule.

According to the first aspect, reservation can be performed by only directly pointing, on a display screen, to data associated with weekly timer reservation for recording TV programs displayed on the screen.

A second aspect of the present invention provides a timer reservation display apparatus which sets a timer program having day-of-week data and time data and stores programs in a unit week, including present day-of-week data and selected future day-of-week data.

This aspect of the present invention also displays a reservation schedules using the present day of the week as a display start day. The present invention then allows the user to switch the display to show a reservation schedule for another week while continuing to use the present day of the week as the display start day.

According to the second aspect, when a reservation schedule is displayed on a TV screen, reservation schedules for a week are displayed with reference to the present day of the week with the present day of the week shifted and displayed for the second and third weeks. Therefore, the user can display absolute positions of future reservation schedules in relation to the present day of the week.

According to a third aspect of the present invention, there is provided a timer screen reservation system comprising a light pen for pointing on a CRT screen, a light pen signal amplifier circuit for amplifying a signal from the light pen, and means for processing a desired reservation schedule based on an output from the light pen signal amplifier circuit.

The light pen signal amplifier circuit used with the present invention includes photoelectric conversion means for photoelectrically converting a raster beam from the CRT screen, first amplifying means for inverting and amplifying a beam signal output from the photoelectric conversion means, detecting means for detecting the output signal from the first amplifying means, second amplifying means for inverting and amplifying a detection signal output from the detection means, and waveshaping means for waveshaping the signal output from the second amplifying means to output a pulse signal.

According to the light pen signal amplifier circuit of the third aspect, the beam signal output from the photoelectric conversion means is inverted and amplified by the first amplifying means to obtain an inverted signal. The detection means detects the inverted signal to obtain a detection signal. The detection signal is inverted and amplified by the second amplifying means, and the inverted detection signal is output. The waveshaping means waveshapes the inverted detection signal with a threshold voltage, thereby outputting a pulse signal.

According to a fourth aspect of the present invention, there is provided a timer screen reservation system comprising a light pen for pointing on a CRT screen, a light pen signal amplifier circuit for amplifying a signal from the light pen, and means for processing a desired reservation schedule based on an output from the light pen signal amplifier circuit.

This light pen signal amplifier circuit includes a waveshaping circuit having a photodetector, for photoelectrically converting a beam from the CRT screen, and a comparator, for comparing and waveshaping an input signal from the photodetector applied at one input terminal with a threshold level voltage applied at the other input terminal. The waveshaping circuit also includes a semiconductor element for applying a potential difference across the input terminals of the comparator and an integrator circuit for integrating a potential at the other input terminal.

In the waveshaping circuit of the fourth aspect, a diode (semiconductor element) inserted in a normal bias state between the positive and negative input terminals of the comparator performs half-wave rectification of a signal from the photodetector, which is applied to the positive input terminal. The diode also decreases the potential of the signal and outputs the signal to the integrator connected to the negative input terminal. Thus, the integrator supplies a voltage (threshold level voltage) lower than that at the positive input terminal by a predetermined level to the negative input terminal. The comparator waveshapes the signal from the photodetector with the threshold level.

According to a fifth aspect of the present invention, there is provided a timer screen reservation system comprising a light pen for pointing on a CRT screen, a light pen signal amplifier circuit for amplifying a signal from the light pen, and means for processing a desired reservation content based on an output from the light pen signal amplifier circuit, the processing means including means for selectively subjecting pointing coordinates by the light pen to correction; depending on whether a scan scheme of the CRT screen is a conventional interlace scheme or a double scan scheme.

According to a sixth aspect of the present invention, there is provided a timer screen reservation system comprising a light pen for pointing on a CRT screen, a light pen signal amplifier circuit for amplifying a signal from the light pen, and means for processing a desired reservation content based on an output from the light pen signal amplifier circuit.

In this aspect, a processing means has a counter for counting reference clocks for providing position coordinates in the horizontal and vertical directions of the CRT screen with reference to an interlace scan scheme, coordinate data generation means for outputting a count value output from the counter as horizontal coordinate data when a detection signal from the light pen is input, and coordinate data correction means for correcting the coordinate data such that the coordinate data be doubled when an index of the coordinate data is smaller than a value $\frac{1}{2}$ a 1H count value of the reference clocks counted by the counter during one horizontal scanning period. Note that the 1H count value is subtracted from the doubled value of the coordinate data when the index is equal to or larger than a value ½ the 1H count value so that pointing locations of the light pen in the interlace scan scheme and another scan scheme coincide with each other.

In the processing means of the sixth aspect, since the counter for counting coordinates counts clocks with reference to a video signal in the interlace scan scheme, a coordinate value of a pointing location designated by the light pen can be obtained with reference to the interlace scan scheme in, e.g., a double scan scheme. When the coordinate value is smaller than a value ½ the 1H count value of the counter, it is determined that the coordinate value represents point A1 in FIG. 4, and the coordinate data is corrected to be doubled as new coordinate data. When the coordinate value is equal to or larger than a value ½ the 1H count value, it is determined that the coordinate value represents point A2 shown in FIG. 4, and the 1H count value is subtracted from the doubled value of the coordinate value, so that point A2 can coincide with point A1. Therefore, pointing locations identified by the light pen can coincide with each other in different scan schemes.

In a conventional light pen apparatus which can input various external data upon point designation of the light pen, when a video signal subjected to a light pen operation is displayed while converting a scan scheme, position coordinates before and after conversion cannot often coincide with each other.

BRIEF DESCRIPTION OF THE DRAWINGS

These and other objects and features of the present invention can be understood through the following embodiments by reference to the accompanying drawings, in which:

FIGS. 7A and 7B and FIGS. 8A and 8B are views explaining the operation of the apparatus shown in FIG. 6;

FIGS. 10 and 11 are explanatory views showing display screens in the apparatus shown in FIG. 9;

FIGS. 13A to 13C and FIGS. 14A to 14C-2, respectively, are views showing display screens and flow charts for exemplifying the operation of the system in FIG. 12;

FIG. 15 is a circuit diagram of a light pen signal amplifier circuit used in the reservation system of the present invention;

FIGS. 16A to 16D are operation signal waveform charts of the circuit shown in FIG. 15;

FIG. 17 is a circuit diagram showing another amplifier circuit;

FIG. 21 is a block diagram of a digital TV receiver for explaining a double scan scheme;

FIG. 23 is a block diagram showing an embodiment of a coordinate data correction apparatus of the light pen apparatus used in the reservation system of the present invention;

FIGS. 24A and 24B and FIG. 25 are views for explaining the operation of the apparatus shown in FIG. 23.

DETAILED DESCRIPTION OF THE PREFERRED EMBODIMENTS

Figure 1:
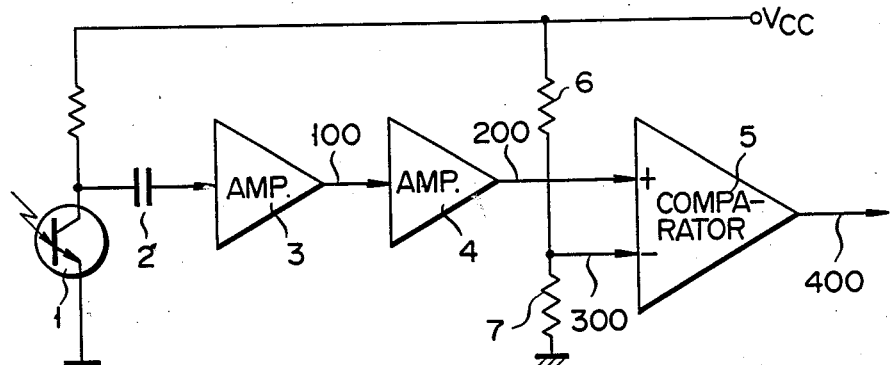
FIG. 1 is a circuit diagram showing a conventional light pen signal amplifier circuit.
Figure 2A:
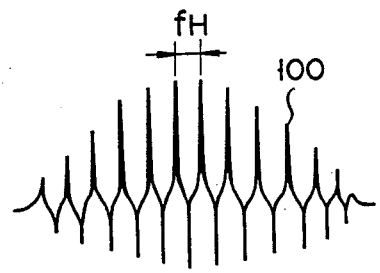
FIGS. 2A, 2B, and 2C are operation signal waveform charts of the circuit shown in FIG. 1.
Figure 2B:
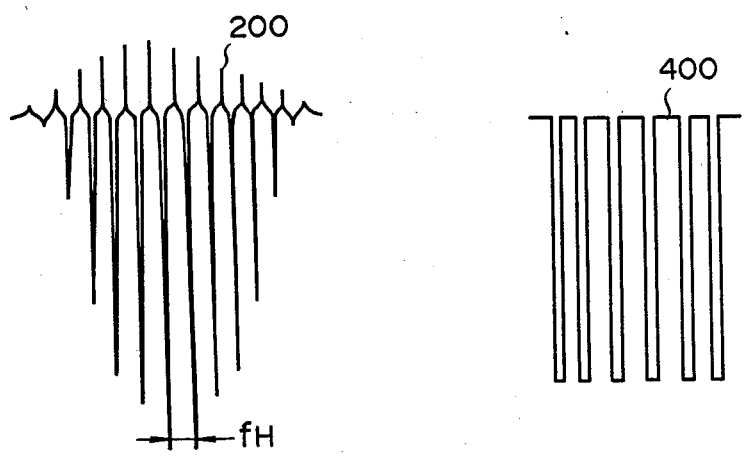
Figure 2C:
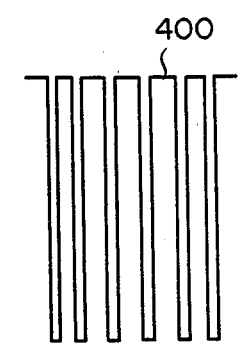
Figure 3:
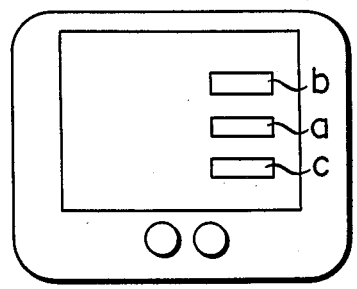
FIG. 3 is a view showing light pen selection portions on a CRT screen.
Figure 4A:
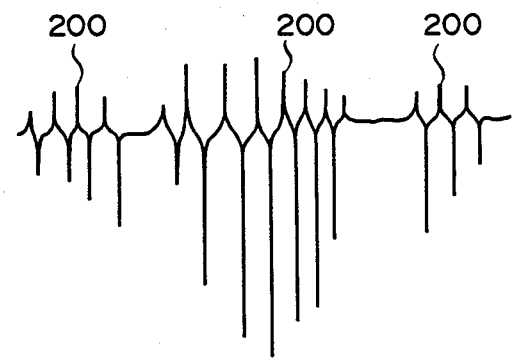
FIGS. 4A and 4B are operation waveform charts of the circuit shown in FIG. 1 when a light-receiving angle is widened in the vertical direction of a light pen.
Figure 4B:
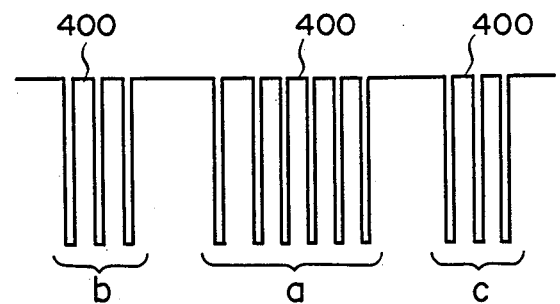
Figure 5:
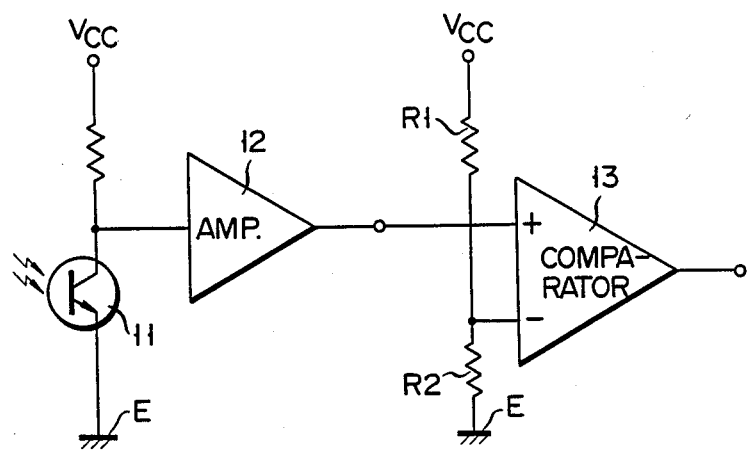
FIG. 5 is a circuit diagram showing a conventional waveshaping circuit used in the light pen signal amplifier circuit.
Figure 6:
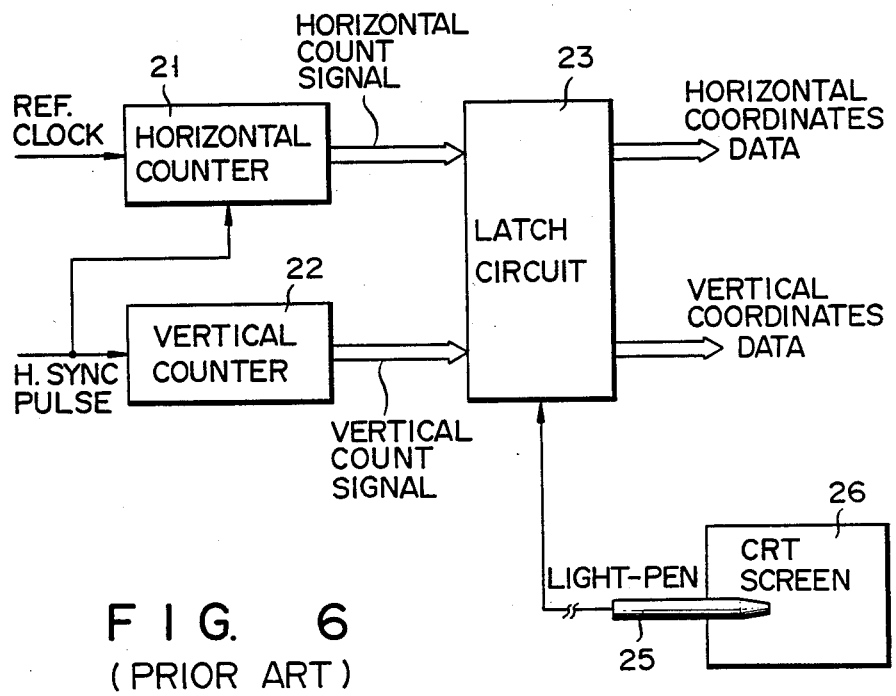
FIG. 6 is a block diagram showing an arrangement of a conventional light pen apparatus.

The present invention will be described with reference to some embodiments illustrated in the drawings.

Figure 9:
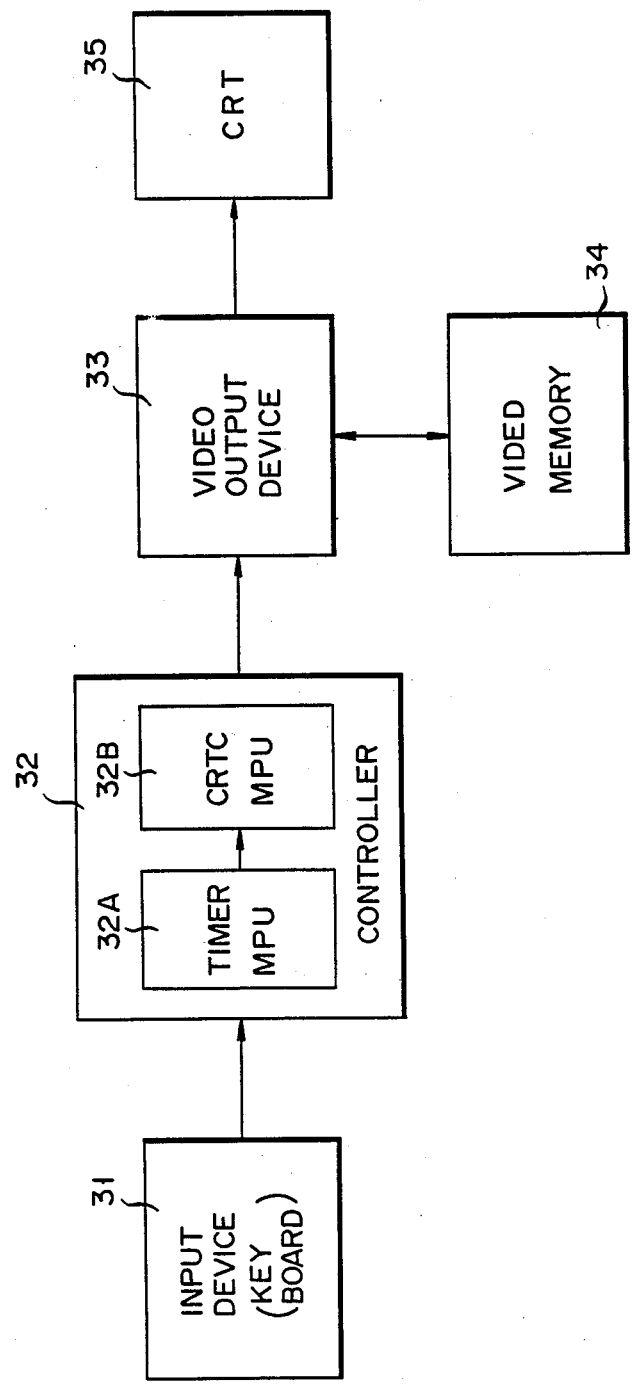
FIG. 9 is a block diagram showing a timer reservation display apparatus according to a first embodiment of the present invention.
Figure 10:
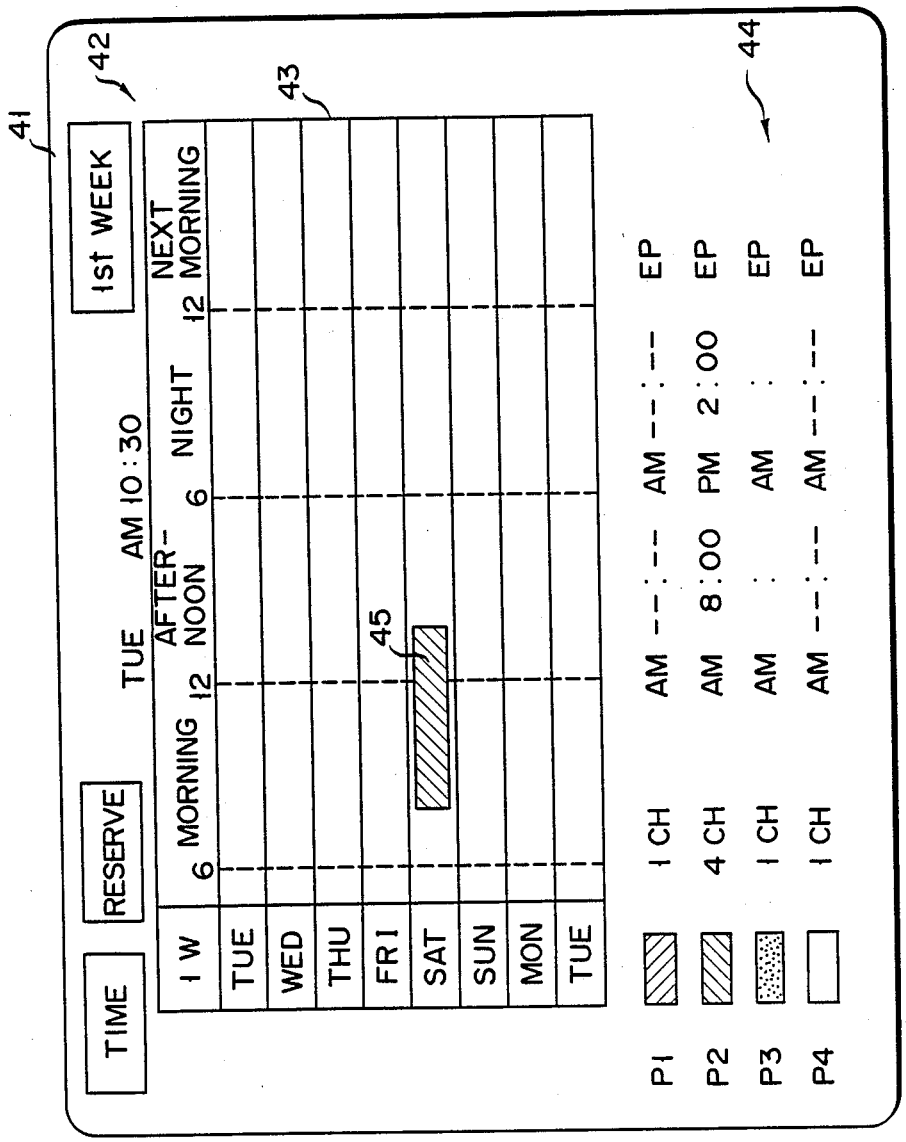

FIG. 9 is a block diagram showing a timer reservation display apparatus according to a first embodiment of the present invention. FIG. 10 is an explanatory view showing a display screen of a reservation schedule.

Referring to FIG. 9, in the timer reservation display apparatus, a reservation schedule is set by input device 31 such as a keyboard, and is stored in controller 32 connected to the output terminal of input device 31. Controller 32 controls video output device 33 to display the reservation schedule. Video output device 33 outputs the display screen data stored in video memory 34 to CRT (Cathode-Ray tube) 35 in accordance with the reservation schedule. Controller 32 comprises timer microcomputer (MPU) 32A and CRT controlling microcomputer (CRTC-MPU) 32B. Timer MPU 32A controls such that the start day of the week of the reservation schedule displayed is automatically set to be the present day of the week. The reservation schedule for any week may thus, be displayed with reference to the present day of the week. Timer MPU 32A is programmed such that the reservation schedules for the second and third weeks are displayed with reference to the present day of the week. Input device 31 has a key for shifting a screen in units of a week in order to achieve the control according to this program. CRTC-MPU 32B is programmed to control video output device 33 in correspondence with the reservation schedule.

With the above arrangement, controller 32 stores the reservation schedule sent from input device 31, and performs a control operation in accordance with the programs stored in the ROMs of MPUs 32A and 32B. MPU 32B controls video output device 33 to read out display screen data from video memory 34 and to display the readout data on CRT 35. FIG. 10 shows an example of a display screen. Reference numeral 41 denotes a display screen; 42, a message space on the upper portion of the screen; 43, a reservation time table; and 44, a message space on the lower portion of the screen. A display indicating a time reservation mode, a display indicating the present day of the week, a display of the present time (in FIG. 10, AM 10:30 on Tuesday), and a display indicating the order of weeks with reference to the present day of the week (in FIG. 10, 1st week) are made on message space 42. In reservation time table 43, the ordinate represents the days of the week, and the abscissa represents time. The time is displayed in units of 6 hours, and "MORNING", "AFTERNOON", and "NIGHT" are displayed in correspondence therewith. "NEXT MORNING" is displayed between AM 12:00 to AM 5:00 of the next day. The present day of the week (in FIG. 10, Tuesday) as a reference is displayed in the uppermost column of the days of the week, followed by the seven days of the week (total of 8 days). If the updated present time advances and the day of the week is changed, the present day of the week is displayed on the uppermost column. In message space 44, program numbers P1 to P4 are displayed, and four TV programs can be reserved. Next to each program number, a sample indicating a color to be displayed in the form of a bar graph in the time table is displayed. For example, program number P2 corresponds to bar graph 45, and represents that a TV program of channel 4 from AM 8:00 to PM 2:00 is reserved in an EP mode (long-time mode) as a recording mode. No program is reserved in program numbers P1, P3, and P4.

Figure 11:
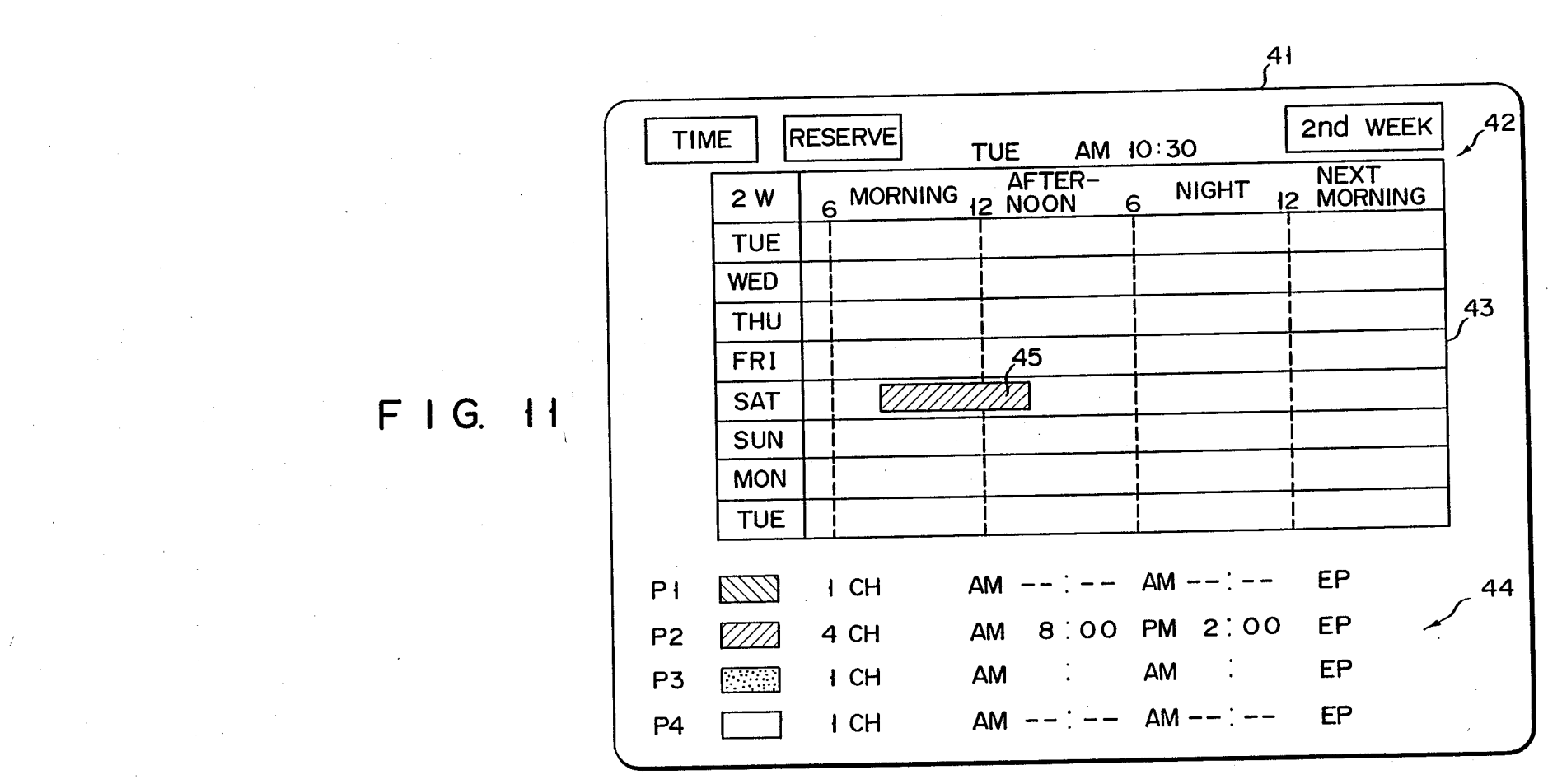

When the shift operation key of input device 31, connected to MPU 32A, is operated on the display screen, the screen is shifted by a week to that for the second week. In this case, as shown in FIG. 11, the day of the week advanced by seven days from the present day of the week, i.e., a day of the week of the next week, is displayed on the uppermost column of the time table, followed by seven days of the week. The reserved content is displayed on the time table in the form of a bar graph. If the present time advances and the day of the week is shifted, since the display on the screen always starts with the updated present day of the week, a user can easily confirm reservation contents at a glance. In this case, the reservation contents for the 2nd week are the same as those for the 1st week. However, the present invention is not limited to this, as a matter of course.

As described above according to the present invention, since the reservation content can be displayed as an absolute position with reference to the present day of the week at a display time, the reservation content can be easily and visually confirmed.

A week reservation system for recording TV programs with a timer screen as a practical embodiment of the first embodiment will be described hereinafter as a second embodiment.

Figure 12:
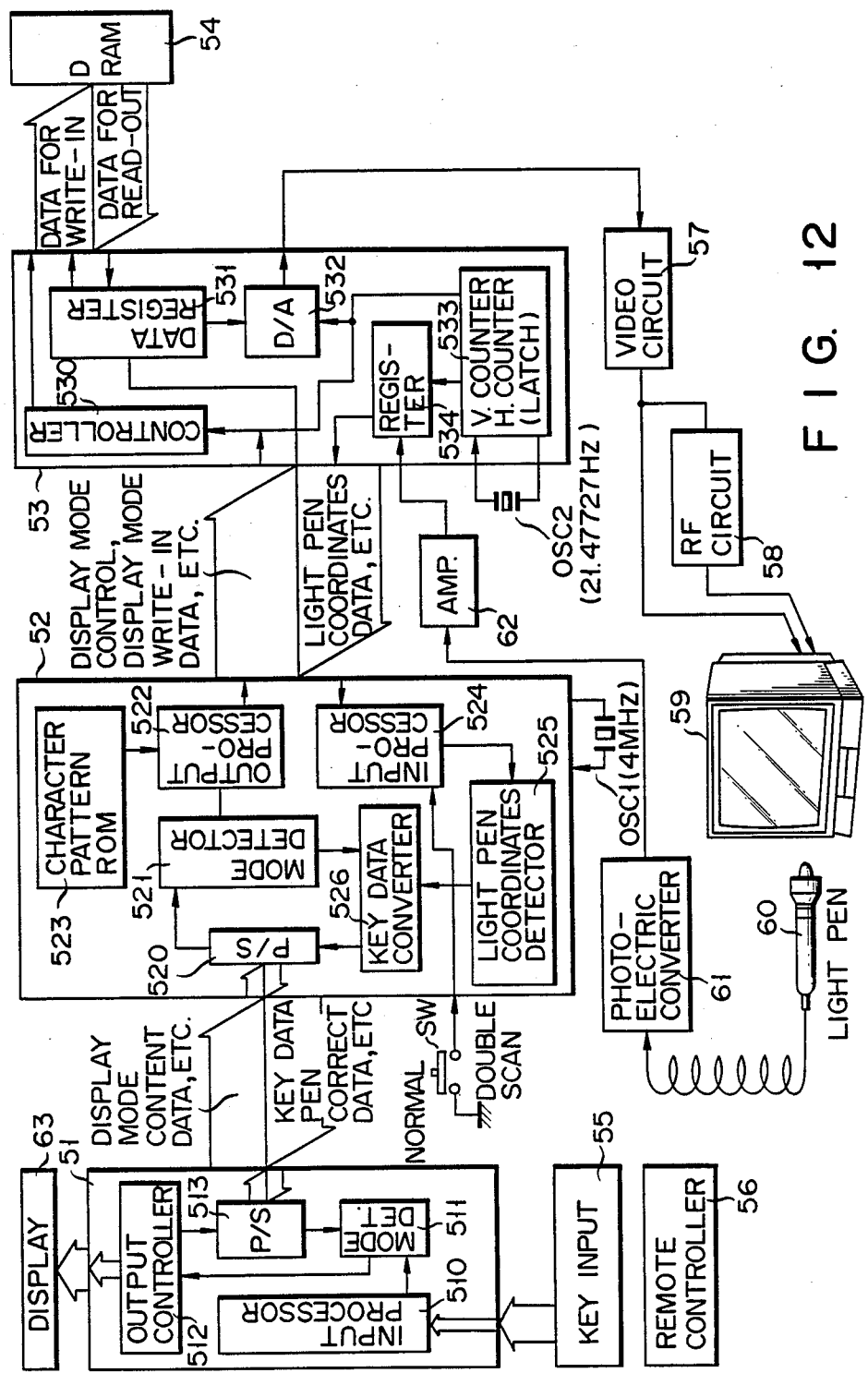
FIG. 12 is a block diagram showing a timer screen reservation system according to a second embodiment of the present invention.

As shown in FIG. 12, the reservation system has first and second MPUs 51 and 52, CRTC 53, and dynamic RAM 54. First MPU 51 has input controller 512, mode detector 511, output controller 512, and serial processor 513. MPU 51 processes an input from remote controller 56 and serves as a timer microcomputer for processing time data as a timepiece circuit. MPU 51, a commercially available IC such as μPD75208CW 033/039 can be used. Second MPU 52 has serial controller 520, mode detector 521, output controller 522, character pattern ROM 523, input controller 524, light pen coordinates detector 525, and key data converter 526. MPU 52 performs graphic control, and can be a commercially available IC such as TMP47C800N2202. CRTC 53 has dynamic RAM controller 530, data register 531, D/A converter 532, V.counter/H.counter unit 533, and register 534, and performs video data processing. For example, CRTC 53 can comprise a commercially available IC such as TGA8601.

First and second MPUs 51 and 52 are coupled such that data, such as a display mode, the present time, a reservation content, and the like, are sent from the former MPU to the latter MPU. Similarly, data such as a light pen input, correct value data, and the like, are sent from the latter MPU to the former MPU. Second MPU 52 and CRTC 53 are coupled such that data for display mode control, display pattern write access, and the like are sent from the former to the latter, and light pen coordinate data is sent from the latter to the former. CRTC 53 and dynamic RAM 54 are coupled such that data is written by the former in the latter, and is read out from the latter to the former.

CRTC 53 is coupled to TV receiver (CRT) 59 to display the current time, the reservation content, and the like through external video circuit 57 and RF circuit 58 from its D/A converter 532. Register 534 of CRTC 53 is coupled to light pen 60 as an input means for reservation scheduling using a timer screen (to be described later) through photo/electric converter 61 and amplifier 62. Thus, CRT 59 can be used as a timer screen and the predetermined portion on the screen thereof can be pointed on by light pen 60, thereby allowing timer reservation.

Note that the present time is also displayed on indicator 63, e.g., a phosphor display coupled to first MPU 51.

Time setting and timer reservation can be performed upon operation of key input device 55 or remote controller 56. A case will be described wherein the above operations are performed using light pen 60.

Figure 14A:
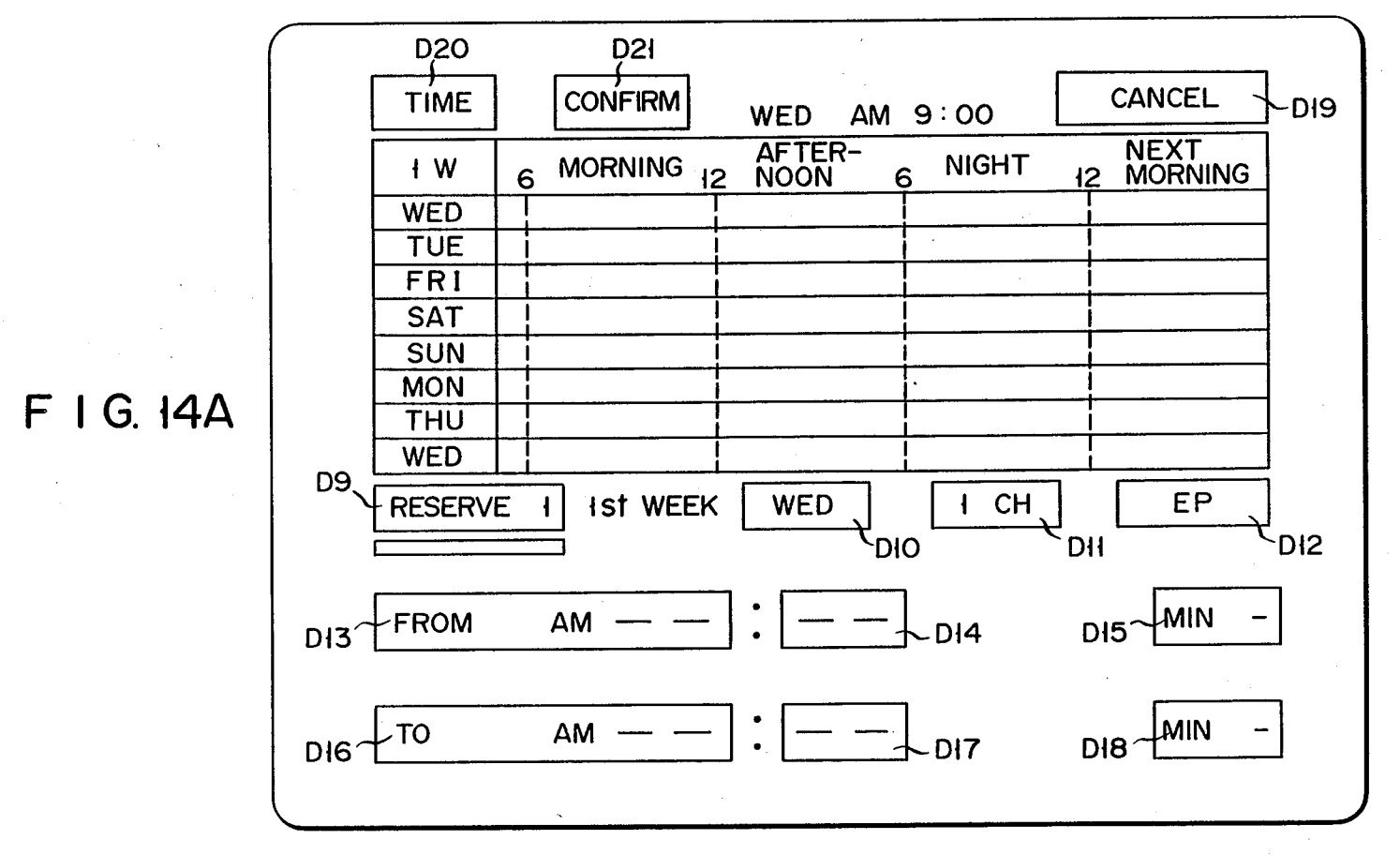
Figure 14B:
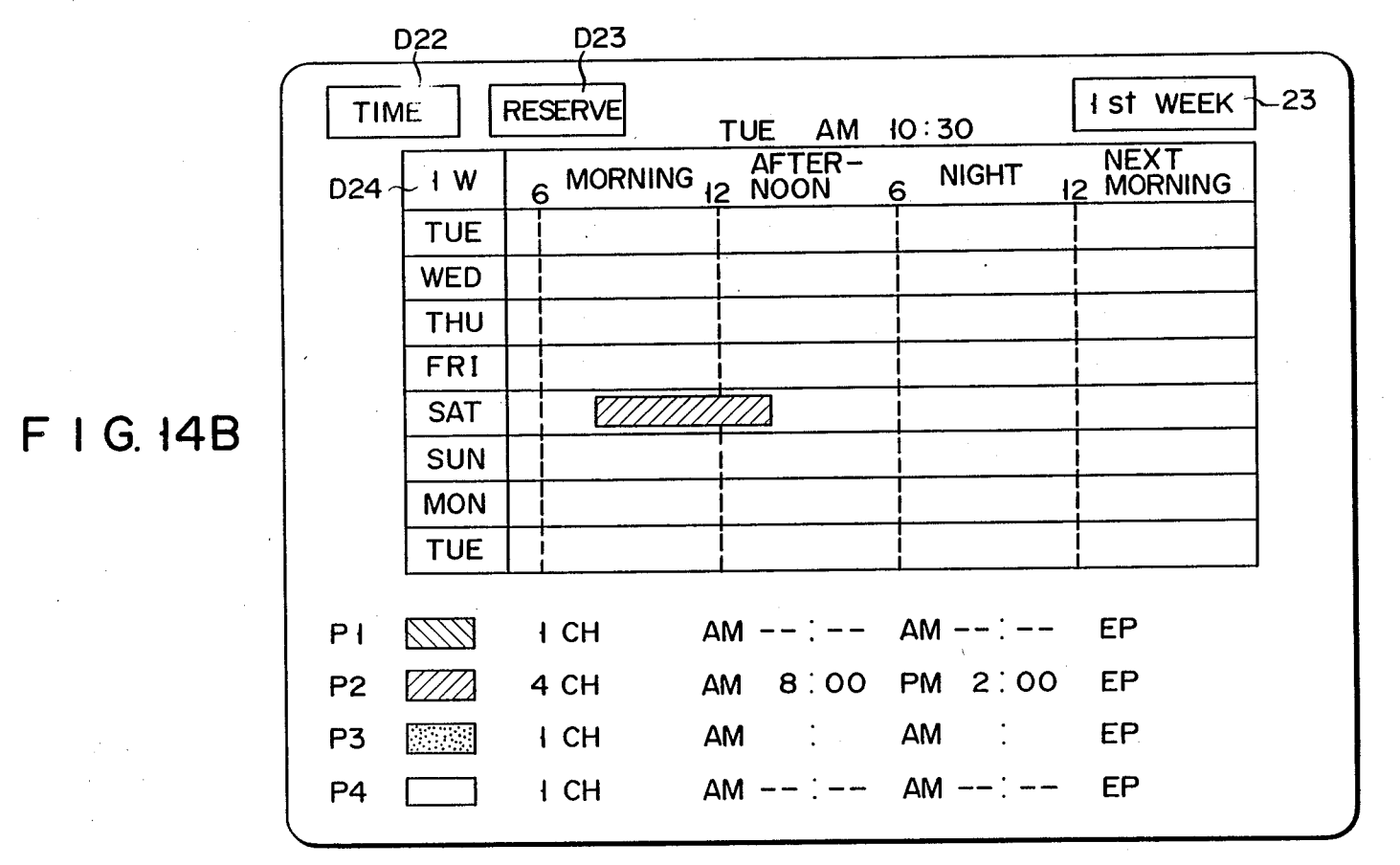
Figures 1, 14C:
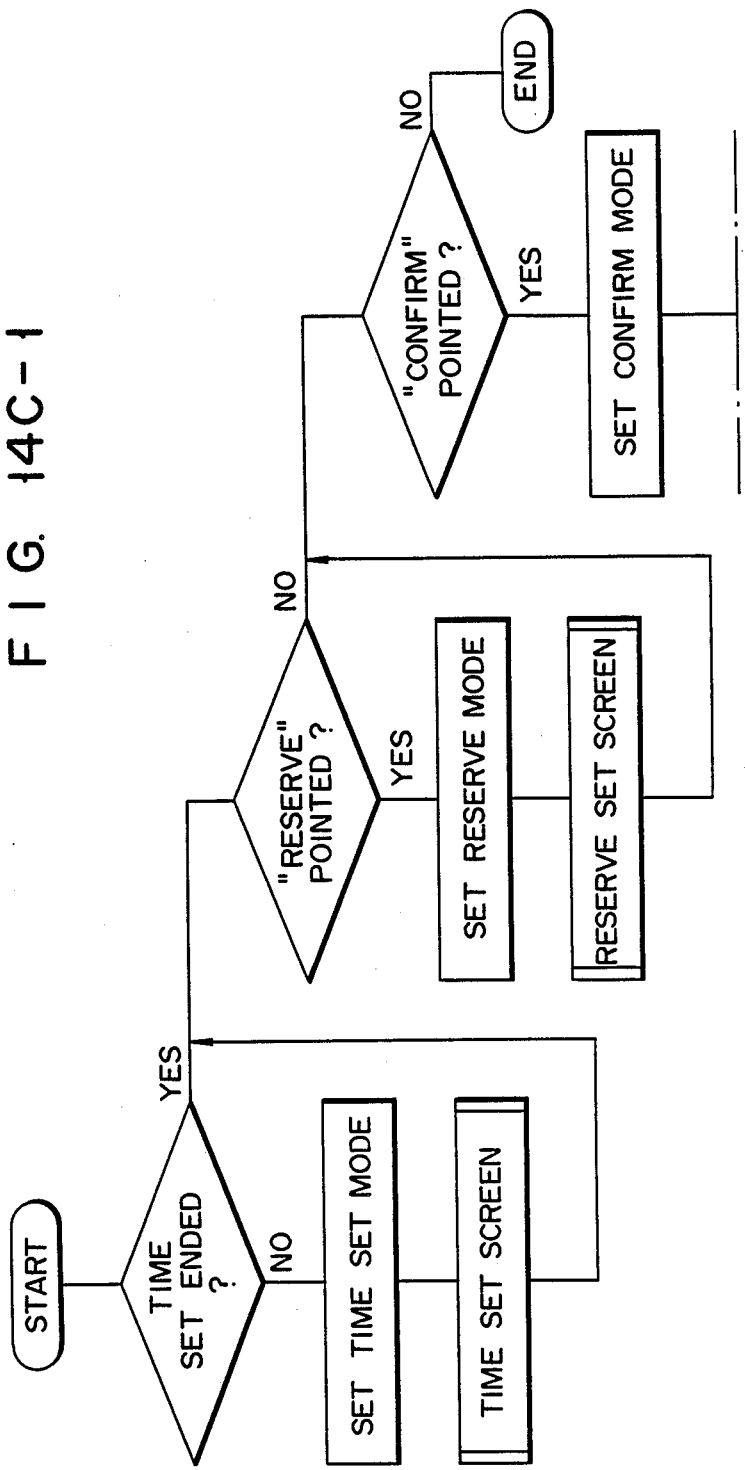
Figures 2, 14C:
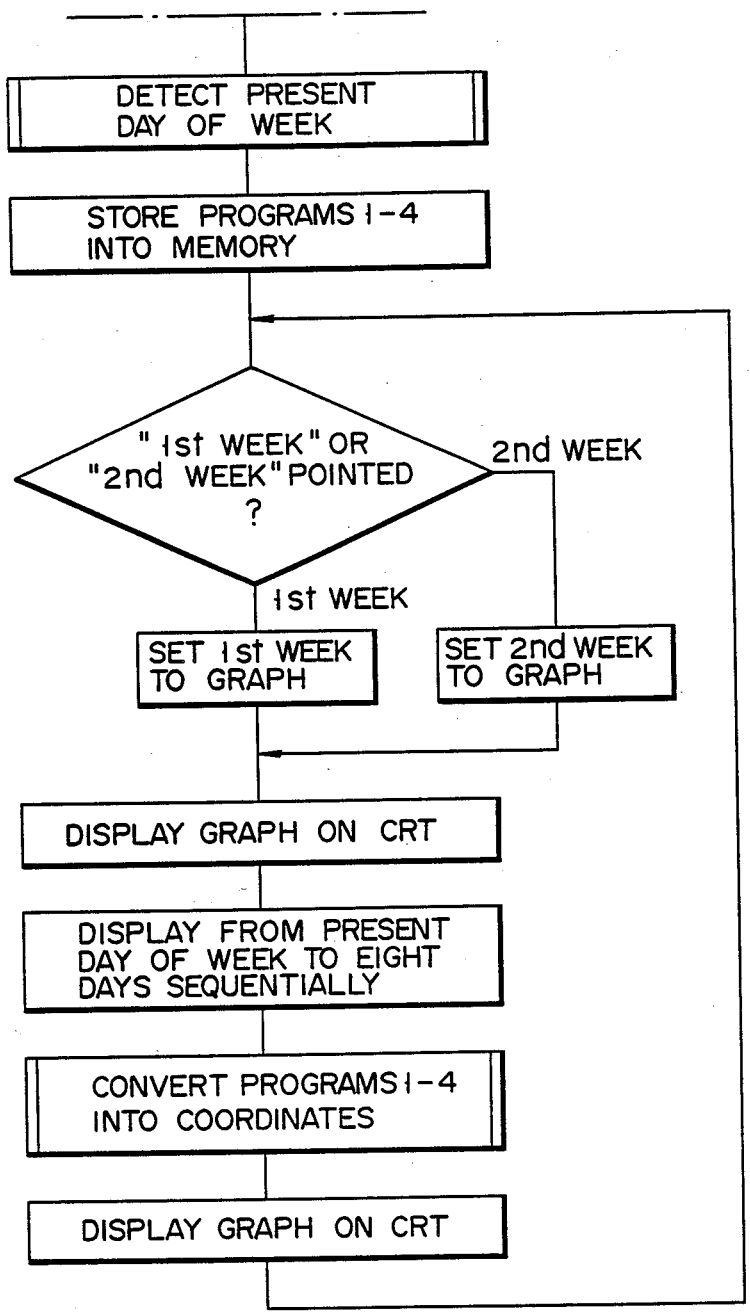

The reservation system with the above arrangement is characterized by displaying a timer screen by a 256×192 dot graphic image on CRT 59. Display modes associated with the reservation operation include four guidance modes, i.e., a time menu mode, shown in FIG. 13C; a time setting mode, shown in FIG. 13B; a reservation mode, shown in FIG. 14A; and a confirmation mode, shown in FIG. 14B. When a timer screen key (not shown) of key input device 55 or remote controller 56 is depressed, after the time setting operation has been completed, a normal TV screen is shifted to a time menu display shown in FIG. 13C. This display (other displays to be described later) and control for associated sections are performed according to program ROMs (not shown) incorporated in first and second MPUs 51 and 52, as shown in the flow chart shown in FIGS. 14C-1 and 14C-2.

FIG. 13A illustrates an initial screen display when the timer screen key is depressed while the time setting operation has not yet been completed. When a "TIME SET" D1 portion on this screen is pointed to by light pen 60, a time setting mode screen is displayed as shown in FIG. 13B. On this screen, "WEEK" D2, "HOUR+" D3, "MIN+" D4, "MIN−" D5, and "END" D6 are sequentially pointed to by light pen 60 a predetermined number of times, so that the present time can be set, and a time menu mode display is made as shown in FIG. 13C. If pointing to "END" D6 is made in synchronism with time casting, the present time can start with reference to 0 second. FIG. 13C illustrates time set at PM 5:35 on Monday by both an analog display of a graphic watch and a digital display of PM 5:35, and a display of "MON".

When "RESERVE" D7 is pointed to by light pen 60 on this screen, the reservation mode shown in FIG. 14A is displayed. On this display screen, start and end times of a new reservation are indicated by a cursor, and other reservations which have already been made are graphically displayed in the form of a bar graph. Selection items for setting reservation include reservation number D9 serving as a content display, day of the week D10, channel D1, tape speed D12, digits of hour and minute of each of start and end times, and decrement for digits of minute "MIN –" (D13 to D18), and "CANCEL" D19. Also, mode shifting items, "TIME" D20 and "CONFIRM" D21, are provided. The reservation bar graph can only include substantially one week from the present day of the week to the corresponding day of the week, e.g., 8 days. If a day of the week subjected to reservation corresponds to a day in the second week, "2W" or "2nd WEEK" is displayed. Otherwise, "1W" or "1st WEEK" is displayed.

Reservation number D9 includes, e.g., "RESERVE 1" to "RESERVE 4", and four recording time reservations can be made within each week. These four reservations of "RESERVE 1–4" are displayed in different colors.

Upon practical reservation, selection items D9 to D21 are sequentially pointed to by light pen 60 a predetermined number of times as needed, and a desired content can be reserved.

If "CONFIRM" D21 on the display screen of the reservation mode or "CONFIRM" D8 on the display screen of the time menu mode is pointed to by light pen 60, the confirmation mode shown in FIG. 14B is displayed. In the confirmation mode, all the reservation schedules reserved in the above-mentioned reservation mode are displayed in the form of a bar graph, and at the same time, reservation numbers (P1 to P4), channels, start and end times, and tape speeds (EP or SP) are displayed. Selection items D22 to D24, i.e., "TIME", "RESERVE", an item for switching graphic-display of "1W" or "1st WEEK", "2W" or "2nd WEEK", are displayed for a pointing operation of light pen 60.

Note that selection item D10 on the display screen of the reservation mode shown in FIG. 14A includes every day of every week, week days, and every day in addition to days of a week of the 1st or 2nd week, thus facilitating the reservation operation.

With the reservation system using the timer screen, a predetermined content on a screen on which a guidance (menu) and items associated with timer reservation are displayed can be pointed to, so that a desired content can be easily reserved.

As an input means for pointing, a pointing device, such as a so-called mouse, can be used in addition to the device in the second embodiment.

Some partial embodiments associated with a light pen in the reservation system using the timer screen in the second embodiment in which the light pen is utilized as an input means will be described hereinafter.

FIG. 15 is a circuit diagram of a light pen signal amplifier corresponding to amplifier 62 shown in FIG. 12. Reference numeral 1 denotes a phototransistor, attached to an end portion of a light pen, for receiving a raster beam from a CRT screen and photoelectrically converting it; 2, a capacitor for extracting an AC component from the light-receiving signal from phototransistor 1; 3 and 4, amplifiers for inverting and amplifying input signals; 5, a comparator for waveshaping an output signal from amplifier 4 with a threshold voltage (to be described later); 6 and 7, resistors for generating the threshold voltage by voltage-dividing power supply voltage Vcc; and 8, a detector for detecting signal 100 output from amplifier 3. Detector 8 comprises diode 81, resistor 82, and capacitor 83. Reference numeral 9 denotes a collector resistor for phototransistor 1.

The operation of this embodiment will now be described. When phototransistor 1 receives a raster beam from the CRT screen, it outputs a photoelectrically converted signal. Capacitor 2 extracts the AC component from the photoelectrically converted signal and outputs it to amplifier 3. Amplifier 3 inverts and amplifies the input signal, and outputs the inverted signal to detector 8. Detector 8 detects the input signal by diode (silicon diode) 81, and outputs detection signal 500 to amplifier 4 as detection signal 600 through capacitor 83. If a forward resistance of diode 81 is given as rD and capacitance of capacitor 83 is given as C, time constant $\tau 1$ of diode 81 and capacitor 83 is $\tau 1 = C \cdot rD$. Since rD is sufficiently small, a rising input of inverted signal 100 substantially directly appears in detection signal 500. On the other hand, discharge time constant $\tau 2$ of resistor 82 and capacitor 83 is $\tau 2 = C2 \cdot R4$. $\tau 2$ is set to be larger than an envelope time constant of inverted signal 100. For example, if the envelope constant is 1 msec to 3 msec, $\tau 2$ is set to be about 25 ms ($=0.1 \mu F 33 \ 25 \ k\Omega$).

For this reason, detection signal 500 has a waveform in which a raster output is superimposed on the first half of an envelope, as shown in FIG. 16A, due to an integral effect the resistor 82 and capacitor 83 combination. The second half of the envelope of signal 500 corresponds to a moderate curve. Note that an increase in inclination of the envelope is switched to decrease at the directional center of the light pen as an inflection point. When detection signal 500, having the above-mentioned waveform, passes through capacitor 83, it is converted to detection signal 600 consisting only of an AC component, as shown in FIG. 16B. Detection signal 600 is inverted and amplified by amplifier 4, and is converted to signal 200 as shown in FIG. 16C. Signal 200 is input to the positive input terminal of comparator 5. The negative input terminal of comparator 5 receives threshold voltage 300 subjected to voltage-division of voltage-dividing resistors 6 and 7. Signal 200 is waveshaped by voltage 300. As a result, pulse signal 400 shown in FIG. 16D is output from comparator 5. The last pulse of pulse signal 400 always corresponds to that by a raster beam at the directional center of the light pen, even if the light-receiving angle of phototransistor 1 is widened in the vertical direction. Therefore, a position detector (not shown) latches the count value of the counter in response to the last pulse of pulse signal 400, so that the directional center of the light pen can be reliably selected and its position can be precisely identified.

According to this embodiment, inverted signal 100 is detected by detector 8 having a large discharge time constant. Therefore, detection signal 500 is generated with a first half superimposed by a raster output and a second half of which is moderately decreasing. Since pulse signal 400 is generated based on detection signal 500, the last pulse of this pulse signal can always correspond to the pulse signal by the raster beam at the directional center of the light pen, and erroneous positional detection can be prevented. Thus, even if a circuit gain is increased, an erroneous operation due to an increase in light-receiving angle in the vertical direction of the light pen can be prevented, and stable positional detection can be performed for CRTs with different amount of lights. Since DC level V0 of detection signal 500 varies in accordance with an intensity of a raster beam received by phototransistor 1, an AGC effect for stabilizing an input to amplifier 4 is provided. In addition, since a small noise component is cut by diode 81, an S/N ratio can be improved. If a raster beam is weak, the detection effect of detector 8 is impaired. However, in this case, since the light-receiving angle of phototransistor 1 is decreased, the erroneous operation cannot occur.

FIG. 17 is a circuit diagram showing a modification of FIG. 15. In this modification, detector 8 comprises diode 81 and capacitor 83. In this case, as diode 81, a germanium diode, or a Shottky barrier diode having a large reverse current, is used. A resistor which is connected in parallel with diode 81 can be omitted, thus simplifying the circuit. Since the diode has a smaller forward voltage drop than that of the silicon diode, it can detect a weak raster beam. Other arrangements and effects are the same as those in the above embodiment.

With the light pen signal amplifier circuit as described above, an inverted and amplified signal of a light-receiving signal from the phototransistor is detected, and a signal obtained by inverting and amplifying the detection signal is waveshaped to generate a pulse signal. Therefore, even if a circuit gain is increased, a pulse signal by a raster beam at the directional center of the light pen can be output to a specific position and positional detection errors in the vertical direction can be prevented.

The principal part of a waveshaping circuit which is applicable to comparator 5, shown in FIGS. 15 and 17, will now be described. In the waveshaping circuit shown in FIG. 18, reference numeral 11 denotes a comparator for waveshaping a signal input at its positive input terminal "+" with a voltage (threshold level voltage) input at its negative input terminal "−"; 12, a diode which is inserted between the positive and negative input terminals of comparator 11 to apply a potential difference thereacross; 13, a capacitor forming an integrator circuit; and 14, a resistor forming the integrator circuit.

Figure 19A:
FIGS. 19A to 19C are waveform charts of the circuit shown in FIG. 18.
Figure 19B:
Figure 19C:

The operation of this embodiment will now be described. When signal 100, shown in FIG. 19A, output from a photoelectric conversion element (not shown), is applied to the positive input terminal of comparator 11, signal 100 is half-wave rectified by diode 12. The rectified voltage is applied to an integrator circuit constituted by capacitor 13 and resistor 14, and is converted to a potential as shown in FIG. 19B. This potential is applied to the negative input terminal of comparator 11. Comparator 11 waveshapes signal 100 applied to its positive input terminal "+" with the threshold level voltage shown in FIG. 19B, and outputs a waveshaped signal shown in FIG. 19C.

According to this embodiment, the threshold level voltage applied to the negative input terminal of comparator 11 is generated by diode 12 and the integrator circuit constituted by capacitor 13 and resistor 14, and its potential can be uniquely determined by the characteristic of diode 12. Therefore, the threshold level voltage cannot be influenced by fluctuations and variations of power supply voltage. For this reason, comparator 11 can always perform a stable waveshaping operation.

Figure 18:
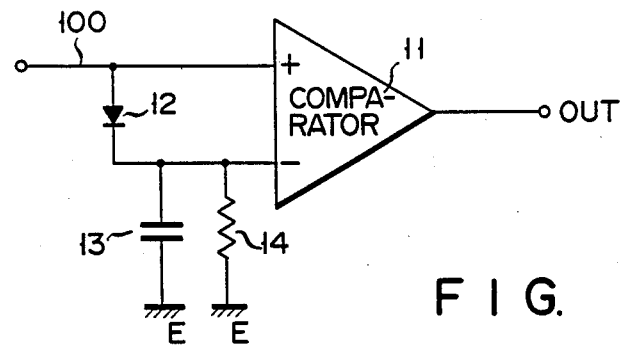
FIG. 18 is a circuit diagram showing an embodiment of a principal part of a waveshaping circuit used in the light pen signal amplifier circuit of the reservation system of the present invention.
Figure 20:
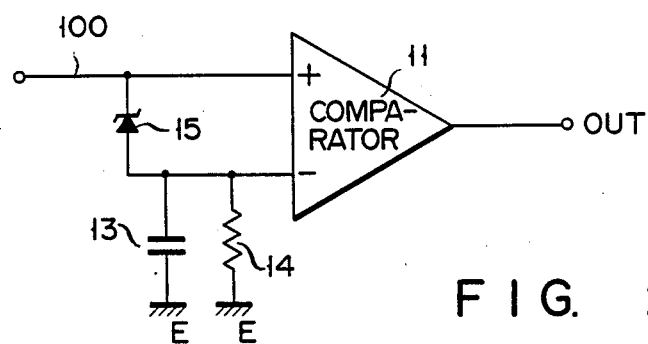
FIG. 20 is a circuit diagram showing a principal part of another waveshaping circuit.

FIG. 20 shows a modification of FIG. 18. In this modification, Zener diode 15 is inserted between the positive and negative input terminals of comparator 11 in the reverse-bias direction. A threshold level voltage applied to the negative input terminal of comparator 11 is generated by integrating a voltage drop by Zener diode 15 with respect to the positive input terminal voltage by an integrator circuit constituted by capacitor 13 and resistor 14. The same operation and effect as in the above embodiment can be obtained. In particular, Zener diodes 15 have various rated Zener voltages. Therefore, the threshold level voltage can be desirably set.

According to the waveshaping circuit as described above, since a voltage for determining a threshold level to be applied to the negative input terminal of the comparator is produced from an input signal applied to the positive input terminal of the comparator, a stable waveshaping operation can always be performed without being influenced by fluctuations and variations in power supply voltage.

Therefore, if the light pen signal amplifier circuit and the waveshaping circuit are applied to the corresponding portion of the present invention, pointing precision of the light pen and reliability of the reservation operation of the reservation system using a timer screen according to the present invention can be assured.

A case will be described wherein TV receiver 59 shown in FIG. 12 employs a double scan (non-interlace) scheme in place of a normal interlace scheme.

The above description of the embodiments including FIG. 12 has been made assuming the use of a normal interlace scheme. The reservation system shown in FIG. 12 allows selection between normal and double scan modes by switch SW in accordance with the scan scheme of receiver 59, and can be applied to receivers of both the scan schemes.

The TV receiver of the double scan scheme will be schematically described hereinafter with reference to FIG. 21. FIG. 21 shows a so-called a digital TV receiver. However, in this receiver, a signal path from tuner 71 to a pair of loudspeakers $SP_L$ and $SP_R$, through PIF converter 72, video detector (PLL sync detector) 73, SIF converter and detector 74, and audio output device 75, corresponds to a conventional analog circuit. A composite video signal from video detector 73 is supplied to digital processor 76. In digital processor 76, the composite video signal is converted to a digital signal by A/D converter 77, and the digital signal is supplied to video chroma processor 78 and deflection circuit 79. Video chroma processor 78 comprises video processiing LSI circuit 80 (e.g., CVPU2235, trade name) which performs video chroma processing of the digital signal through digital comb filter 79; function ROM 81 (e.g., MB7123H-ROM1, trade name) for picture selection; and two line memories 82 and 83 (e.g., PS203, trade name) for generating double scan interpolation signals based on signals from LSI circuit 80 and ROM 81. Deflection circuit 79 comprises deflection processing LSI circuit 84 (e.g., DPU2532, trade name) for performing horizontal and vertical sync processing and deflection processing for the digital signal. Data from line memories 82 and 83 are converted into analog signals by D/A converters 85 and 86. The analog outputs from D/A converters 85 and 86 are supplied to CRT driver 88 through matrix circuit 87 in units of R, G, and B components. Vertical and horizontal sync signals from LSI circuit 84 are supplied to Cathode-Ray Tube (CRT) 91 through V.out and H.out circuits 89 and 90, respectively. CRT 91 also receives R, G, and B component outputs from CRT driver 88. The receiver also has clock generator 92 for supplying system clocks to respective circuits, and switching power supply 93 for supplying a power supply voltage. A/D converter 77, D/A converters 85 and 86, and matrix circuit 87 can be constituted by video codec LSI circuit 94 (e.g. VCU2134, trade name).

Figure 22:
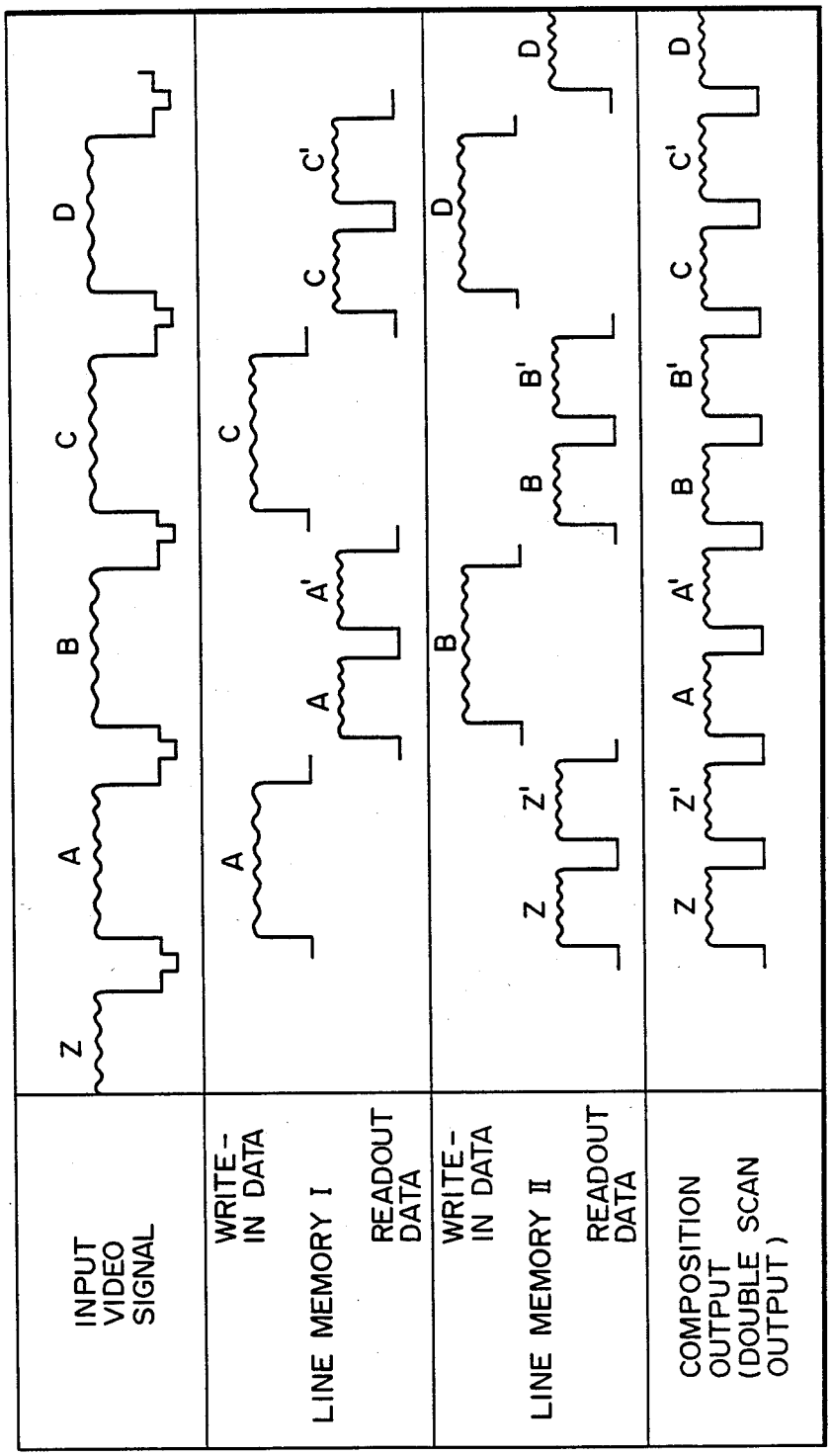
FIG. 22 is a view for explaining the operation of the receiver shown in FIG. 21.
Figure 26:
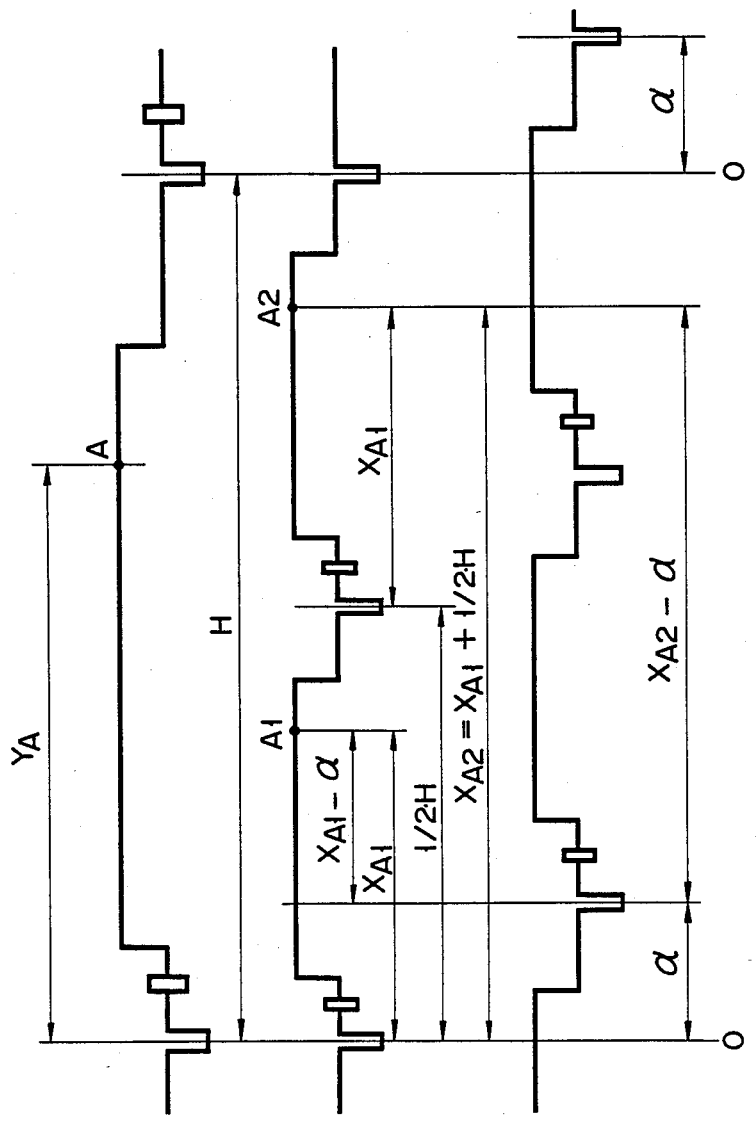
FIGS. 26A to 26C and FIG. 27 are views for explaining the operation when a delay is present in the apparatus shown in FIG. 23.

In the above arrangement, two line memories 82 and 83 are used for the double scan scheme, so that the number of scanning lines within a field is twice that in a normal interlace scheme (265.2×2=525). With respect to two line memories 82 and 83, read and write accesses are alternately performed. While a video signal in one horizontal scanning period is written in one line memory, the video signal written in the scanning period of the immediately preceding field is sequentially read out twice, at a speed twice a write speed. FIG. 22 illustrates a timing chart of the read/write access. More specifically, with respect to an input video signal having a signal string of Z, A, B, C, D, . . . , one line memory I receives signals A and C as write-in data, and outputs double-speed twice readout data A, A', C, and C' of signals A and C readout data. The other line memory II receives signals B and D as write-in data, and outputs double-speed twice readout data Z, Z', B, B' and D (D') of signals Z, B, and D as readout data. Therefore, a composite output of two line memories I and II, i.e., a double scan output includes a signal string like Z, Z', A, A', B, B', C, C', and D (D'). That is, on image having 525 scanning lines per field can be obtained, and very fine, high quality display can be realized. Note that a horizontal deflection frequency is set to be twice that in that in the normal interlace scheme (i.e., 31.4 kHz=15.7035 kGz×2).

A coordinate data correction apparatus of the write pen apparatus for pointing on the screen of the receiver of the double scan scheme based on the above arrangement will now be described.

Referring to FIG. 23, reference numerals 111 and 112 respectively denote horizontal and vertical counters corresponding to V and H counter section 53 shown in FIG. 12.

In FIG. 23, horizontal counter 111 counts reference clocks in synchronism with a video signal displayed on a screen upon interlace screening. Vertical counter 112 counts horizontal sync pulses of the video signal. The horizontal and vertical count signals from counters 111 and 112 are input to latch circuit 113 which performs a latch operation in response to a detection signal from a light pen (not shown) (in FIG. 12, circuit 113 is included in section 553), and are latched thereby in response to the detection signal upon pointing. Reference numeral 114 denotes a correcting circuit for coordinate data according to this embodiment. Correction circuit 114 receives horizontal and vertical coordinate data latched by latch circuit 113, and performs following correction with respect to the horizontal coordinate data when the scan scheme is switched in the double scan scheme.

Assume that a detection signal from the light pen is input. An index of horizontal coordinate data based on the input from the horizontal counter is given as X and a 1H count value corresponding to counts counted by the horizontal counter during one horizontal scanning period in the video signal upon interlace scanning is given as H. If an index of correction data is given as Y, correction data to be output from correcting circuit 14 is corrected to establish the following relations:

when $$X \geq \tfrac{1}{2} \cdot H, \quad Y = 2X - H \tag{1}$$

when $$X < \tfrac{1}{2}, \quad Y = 2X \tag{2}$$

When the circuit for performing the above correction is provided, if a horizontal deflection frequency of an interlaced scanning original video signal is doubled, one horizontal scanning period in the video signal shown in FIG. 24 corresponds to ½ that shown in FIG. 24A. Therefore, index $X_{A1}$ of point A1 has the following relationship with index $Y_A$ of point A:

$$Y_A = 2X_{A1} \tag{3}$$

Index $X_{A2}$ of point A2 has the following relationship with $Y_A$:

$$X_{A2} = X_{A1} + \tfrac{1}{2} \cdot H \tag{4}$$

therefore, $$\begin{aligned} Y_A &= 2(X_{A2} - \tfrac{1}{2} \cdot H) \\ &= 2X_{A2} - H \end{aligned} \tag{5}$$

Therefore, when data correction given by relations (1) and (2) is performed, light pen coordinate data corresponding to the original video signal can be output even in the double scan mode. Therefore, point designation by the light pen can be performed at the same point as point A.

Note that in the above arrangement, correcting circuit 114 comprises a microcomputer equivalent to light pen coordinate detector 525 shown in FIG. 12. In this embodiment, the microcomputer performs the above-mentioned light pen coordinate data correction processing in accordance with the flow chart shown in FIG. 25.

Figure 27:
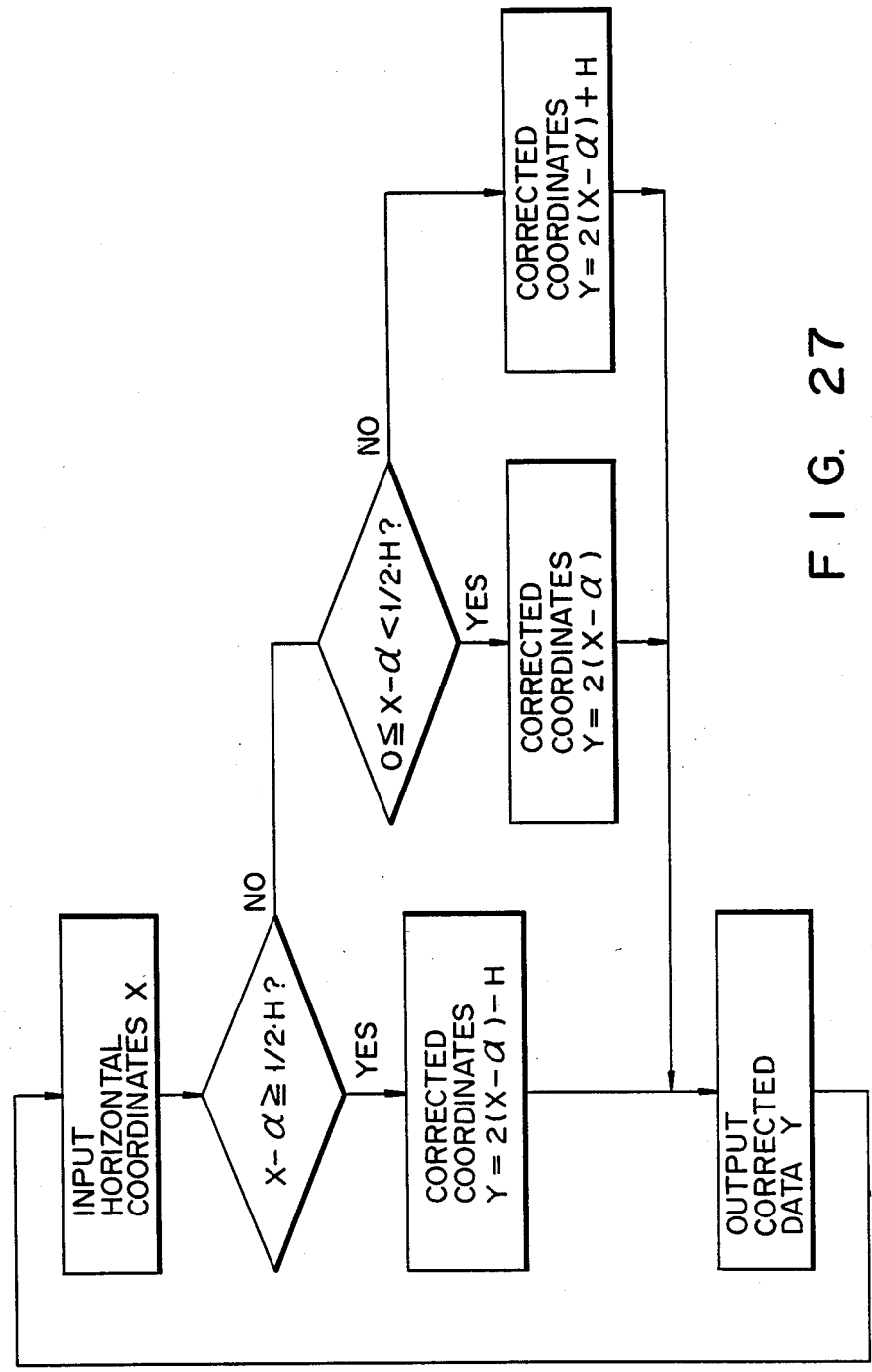

As shown in FIGS. 24A to 26C, if delay α of an actual double horizontal scanning frequency signal poses a problem, correcting circuit 114 described above can be operated in accordance with the flow chart shown in FIG. 27 in order to correct delay α.

In this embodiment, since coordinates of a pointed location are determined with reference to those in the interlace scanning mode, even if the horizontal deflection frequency of the video signal is doubled in order to achieve the double scan mode, a predetermined control operation can be performed by using the write pen at the same screen position as that when the original video signal is displayed.

According to the coordinate data correcting apparatus of the light pen apparatus as described above, even if an original video signal is displayed while switching a scanning scheme, pointed locations in both the modes coincide with each other.

Therefore, even when a receiver of either a normal interlace scanning scheme or double scan scheme is used, a reservation operation using a light pen and a timer screen can be reliably performed.

What is claimed is:

1. A system for reserving the recording of TV programs from a TV having a CRT display, the system comprising:
   timer control means for setting and outputting time data identifying weekly recording time reservations;

reservation schedule display control means for setting and outputting data including:
  a predetermined number of reservation schedules to be displayed on the CRT display along with the time data, the data of reservation schedules including data of guidances, menus, and items, which include at least days of a week and channels associated with the TV programs to be presented for several weeks, and
  data for graphically displaying the time data on said CRT display;
light pen means for pointing to a location on the data of reservation schedules displayed on said CRT display and for receiving a raster beam emitted from the pointed location on said CRT display;
photoelectric conversion means for converting the raster beam received by said light pen into an electrical signal;
coordinate data generating means for generating coordinate data corresponding to the pointed location on said CRT display in response to the electrical signal from said photoelectric conversion means; and
reservation schedule processing means for causing said timer control means and said reservation schedule display control means to display said time data on said CRT display in accordance with the coordinate data from said coordinate data generating means and for supplying a processing signal for graphically displaying predetermined time data on said CRT display.

2. A system according to claim 1, wherein the data of reservation schedules includes data for setting a reservation mode display and a confirmation mode display on said CRT display.

3. A system according to claim 1, further including a scanning mode switch to identify whether or not the coordinates of a pointed location of said light pen correspond to an interlace scanning scheme or a double scanning scheme.

4. A system according to claim 1, wherein said reservation schedule processing means includes a light pen signal amplifier circuit for amplifying a signal emitted from said light pen, said light pen signal amplifier circuit comprising
  photoelectric conversion means for photoelectrically converting a raster beam emitted from said CRT display,
  first amplifying means for inverting and amplifying a light-receiving signal output from said photoelectric conversion means,
  detection means for detecting an output signal from said first amplifying means,
  second amplifying means for inverting and amplifying a detection signal output from said detection means, and
  waveshaping means for waveshaping a signal output from said second amplifying means, to generate a pulse signal.

5. A system according to claim 1, wherein said reservation schedule processing means includes
  a light pen signal amplifier circuit for amplifying a signal emitted from said light pen, said light pen signal amplifier circuit including:
    a waveshaping circuit which comprises a photodetector for photoelectrically converting a beam from said CRT display, and
    a comparator for comparing and waveshaping an input signal from said photodetector, the input signal being supplied to one input terminal, with a threshold level voltage supplied to the other input terminal, the waveshaped circuit comprising:
      a semiconductor element for applying a potential difference across the input terminals of said comparator, and
      an integrator circuit for integrating a potential at the other terminal.

6. A system according to claim 1, wherein said reservation schedule processing means includes:
  coordinate data generating means for generating coordinate data corresponding to the point location of said light pen when a scanning scheme of said CRT display is a double scan scheme, and
  coordinate data correcting means for correcting the coordinate data from said coordinate data generating means to a predetermined value;
  said coordinate data generating means comprises:
    clock generating means for generating reference clocks providing position coordinates in horizontal and vertical directions of said CRT display with reference to a video signal in an interlace scanning mode.
    a counter for counting the reference clocks from said clock generating means, and
    means for, when a detection signal from said light pen is input, outputting a count value output from said counter as coordinate data in the horizontal direction; and
  said coordinate data correcting means comprises
    means for, when an index of the coordinate data is smaller than a value ½ a 1H count value obtained by counting the reference clocks during one horizontal scanning period by said counter, correcting the coordinate data to be doubled, and for, when the index is equal to or larger than a value ½ the 1H count value, correcting the coordinate data to be a value obtained by subtracting the 1H count value from the double value of the coordinate data.

7. A system according to claim 1, wherein said reservation schedule processing means includes coordinate data correcting means for correcting the coordinate data from said coordinate data generating means to a predetermined value when a scanning scheme of said CRT display is a double scan scheme, and wherein the CRT display provides a horizontal frequency signal having a time delay, the coordinate data correcting means correcting for the time delay which is doubled for the double scan scheme.

8. A system according to claim 1, wherein said reservation schedule display control means includes switching means for switching the display of time data and reservation schedule data between a present week and a future week, the display of the future week including the present day of the week as the display start day of the future week.

* * * * *

UNITED STATES PATENT AND TRADEMARK OFFICE
CERTIFICATE OF CORRECTION

PATENT NO. : 4,847,696

DATED : July 11, 1989

INVENTOR(S) : Katsumi Matsumoto, et al.

It is certified that error appears in the above-identified patent and that said Letters Patent is hereby corrected as shown below:

ON THE TITLE PAGE

Please change:

"[30] Foreign Application Priority Data   Aug. 11, 1986 [JP]
    Japan    61-189244(U)      to ---[30] Foreign Application Priority Data   Aug. 11, 1986 [JP]
    Japan    61-189244.

Signed and Sealed this

Twenty-fourth Day of July, 1990

Attest:

HARRY F. MANBECK, JR.

*Attesting Officer*    *Commissioner of Patents and Trademarks*